US011068146B2

(12) United States Patent
Fitzgerald et al.

(10) Patent No.: US 11,068,146 B2
(45) Date of Patent: Jul. 20, 2021

(54) TECHNIQUES FOR USER INTERFACE COMPONENTS

(71) Applicant: EMC IP Holding Company LLC, Hopkinton, MA (US)

(72) Inventors: Robert Fitzgerald, Cork (IE); Ronan Dowd, Cork (IE); Micheal Walsh, Cork (IE)

(73) Assignee: EMC IP Holding Company LLC, Hopkinton, MA (US)

(*) Notice: Subject to any disclaimer, the term of this patent is extended or adjusted under 35 U.S.C. 154(b) by 0 days.

(21) Appl. No.: 16/410,445

(22) Filed: May 13, 2019

(65) Prior Publication Data

US 2020/0363939 A1 Nov. 19, 2020

(51) Int. Cl.
*G06F 3/0484* (2013.01)
*G06F 3/0481* (2013.01)
*G06F 9/451* (2018.01)
*G06F 9/54* (2006.01)
*G06F 40/177* (2020.01)

(52) U.S. Cl.
CPC ........ *G06F 3/04847* (2013.01); *G06F 3/0481* (2013.01); *G06F 3/04842* (2013.01); *G06F 3/04845* (2013.01); *G06F 9/451* (2018.02); *G06F 9/547* (2013.01); *G06F 40/177* (2020.01); *G06F 2203/04803* (2013.01); *G06F 2203/04806* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,498,747 | B1* | 12/2019 | Meaney | .............. H04L 63/20 |
| 2004/0064293 | A1* | 4/2004 | Hamilton | ........... G06F 11/3409 |
| | | | | 702/182 |
| 2012/0023429 | A1* | 1/2012 | Medhi | ................. G06F 11/323 |
| | | | | 715/772 |
| 2012/0271748 | A1* | 10/2012 | DiSalvo | ............... G06Q 40/04 |
| | | | | 705/37 |

(Continued)

OTHER PUBLICATIONS https://www.highcharts.com/blog/snippets/synchronisation-of-multiple-charts/, Prior to May 13, 2019.

(Continued)

*Primary Examiner* — Hien L Duong
(74) *Attorney, Agent, or Firm* — Muirhead and Saturnelli, LLC

(57) ABSTRACT

Techniques for rendering a user interface (UI) may include: issuing a first call to a library in accordance with an application programming interface (API) to render a first dashboard component of the UI, the API including a first plurality of input parameters specifying first metadata for the first component and first request parameters used to obtain information from a server to populate the first dashboard component with data; responsive to the first call, issuing a first set of one or more requests, from the library to the server in accordance with the first request parameters, to obtain first information used to populate the first dashboard component; receiving, by the library from the server, the first information; and rendering the first component in the UI. Rendering may include populating the first dashboard component with the first information.

18 Claims, 25 Drawing Sheets

(56) References Cited

U.S. PATENT DOCUMENTS

2014/0040257 A1\* 2/2014 Chandrasekaran ... G06F 16/972
                                                                707/736
2014/0047079 A1\* 2/2014 Breternitz ............. G06F 9/5072
                                                                709/220
2017/0206684 A1\* 7/2017 Duncker ............... G06F 40/106

OTHER PUBLICATIONS

"Zooming," https://www.highcharts.com/docs/chart-concepts/zooming, Prior to May 13, 2019.
"Understanding HighCharts," https://www.highcharts.com/docs/chart-concepts/understanding-highcharts, Prior to May 13, 2019.

\* cited by examiner

TECHNIQUES FOR USER INTERFACE COMPONENTS

BACKGROUND

Technical Field

This application generally relates to user interfaces and more particularly to user interface components.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for rendering a user interface (UI). A first call is issued to a library in accordance with an application programming interface (API) to render a first dashboard component of the UI. The API includes a first plurality of input parameters specifying first metadata for the first component and first request parameters used to obtain information from a server to populate the first dashboard component with data. Responsive to the first call, a first set of one or more requests are issued, from the library to the server in accordance with the first request parameters, to obtain first information used to populate the first dashboard component. The library receives the first information from the server. The first component is rendered in the UI. The rendering includes populating the first dashboard component with the first information. The techniques may include performing first processing by code of the library that automatically polls the server at each occurrence of a defined polling time interval to obtain a current version of the first information. The first processing may include periodically, in accordance with a defined polling time interval, issuing another set of one or more requests to the server to obtain a current version of the first information; and updating the first component of the UI by populating the first dashboard component with the current version of the first information. The first dashboard component may include a table. The first plurality of input parameters may specify component level metadata for the table, table-specific level metadata for the table, and table request information identifying the first request parameters used to obtain the first information from the server to populate the table. The first dashboard component may include a plurality of charts, wherein each of the plurality of charts is a graphical display of data in the UI. The first plurality of parameters may include an array with an entry for each chart of the plurality of charts. The entry of the array for each chart may be a structure including chart metadata for each chart and including chart request information for each chart. The chart request information for a chart may include a portion of the first request parameters used to obtain a corresponding portion of the first information from the server to populate the chart. The chart metadata for each chart may include information identifying one chart type of a predefined set of chart types. The first request parameters may include a time frame identifying a time period for which the first information is requested from the server in the first set of one or more requests for the plurality of charts. The time frame may be included in second metadata associated with the first dashboard component and may denote the time period for which requests are issued to the server to obtain information used to populate the plurality of charts of the first dashboard component. The techniques may include receiving, by the library, a second call to update the time frame associated with the first dashboard component, wherein the second call includes a parameter identifying a revised time frame; and responsive to receiving the second call, updating the second metadata of the first dashboard component to include the revised time frame wherein the revised time frame replaces the time frame. Prior to the second call, the first set of one or more requests may have requested the first information based on the time frame, and wherein, subsequent to the second call, the techniques may include issuing a second set of one or more requests from the library to the server to obtain a current version of the first information, wherein the second set of one or more requests request information based on the revised time frame; and updating the first component of the UI by populating the first dashboard component with the current version of the first information. The plurality of charts may be rendered on the UI in accordance with layout information included in the second metadata associated with the first dashboard component. The layout information may include a number of columns. The techniques may further include rendering the plurality of charts on the UI in a layout having the number of columns; selecting a user interface element to minimize a first of the plurality of charts; and responsive to selecting the user interface element, performing first processing including: minimizing the first chart; determining, in accordance with the layout information, a revised layout for the plurality of charts without the first chart; and rendering the plurality of charts without the first chart in accordance with the revised layout. The plurality of charts may include N charts and, at a point in time, a first number of the N charts may be minimized, and a remaining number, R, of the N charts may not be minimized. The techniques may include determining whether R is less than the number of columns, M; and responsive to determining R is less than N, determining the revised layout, when displayed, renders the R charts in R columns in the first dashboard component. The plurality of charts may be rendered on the UI, and the techniques may include: selecting a user interface element to synchronize the plurality of charts; responsive to selecting the user interface element, setting an option that synchronizes the plurality of charts responsive to a user interaction in a first of the plurality of charts, wherein a remaining chart set includes the plurality of charts without the first chart; identifying, via the user interaction with the UI, a location in the first chart; responsive to said identifying, performing first processing including: displaying first data corresponding to the location in the first chart on the UI; and synchronizing each chart of the remaining chart set to display information about the location relative to said each chart of the remaining chart set. The plurality of charts may be graphical displays each including an axis denoting time, wherein the location in the first chart identifies a first point in time at which a first metric has a first value and the first data identifies the first point in time, the first metric and the first value, and wherein synchronizing each chart of the remaining chart set to display information about the location relative to said each chart of the remaining chart set further comprises: displaying second data in said each chart, the second data including a current value of a particular metric of said each chart at the first point in time. The user interaction may include any of: positioning a cursor at the location within the first chart, and performing a selection identifying the location within the first chart. Each of the plurality of charts of the first dashboard may be synchronized and rendered in a corresponding portion of the first dashboard component, wherein the first chart is displayed in a first corresponding portion of the first dashboard component. The techniques may further comprise: identifying, in connection with a zoom feature of the UI, a particular portion of the first chart rendered in the UI; rendering, in the first corresponding portion of the first dashboard component, an enlarged view of the particular portion of the first chart; and synchronizing each chart of the remaining chart set to also render an enlarged view of the particular portion relative to said each chart of the remaining chart set.

BRIEF DESCRIPTION OF THE DRAWINGS

Features and advantages of the techniques herein will become more apparent from the following detailed description of exemplary embodiments thereof taken in conjunction with the accompanying drawings in which:

FIGS. 7A, 7B, 8A, 8B, 9A, 9B, 10A-10F illustrate various examples in connection with minimizing charts of a component in an embodiment in accordance with the techniques herein.

DETAILED DESCRIPTION OF EMBODIMENT(S)

Figure 1:
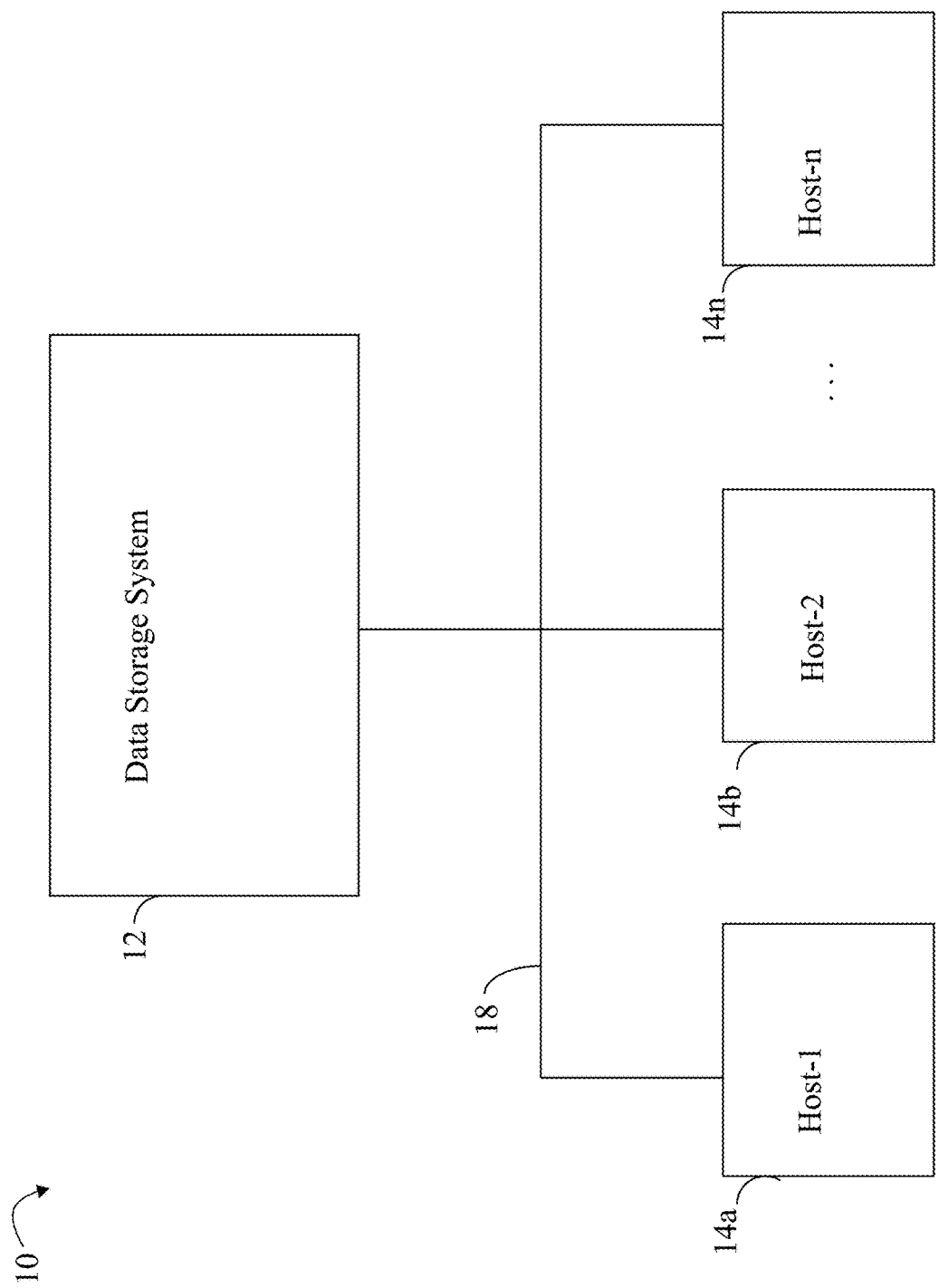
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
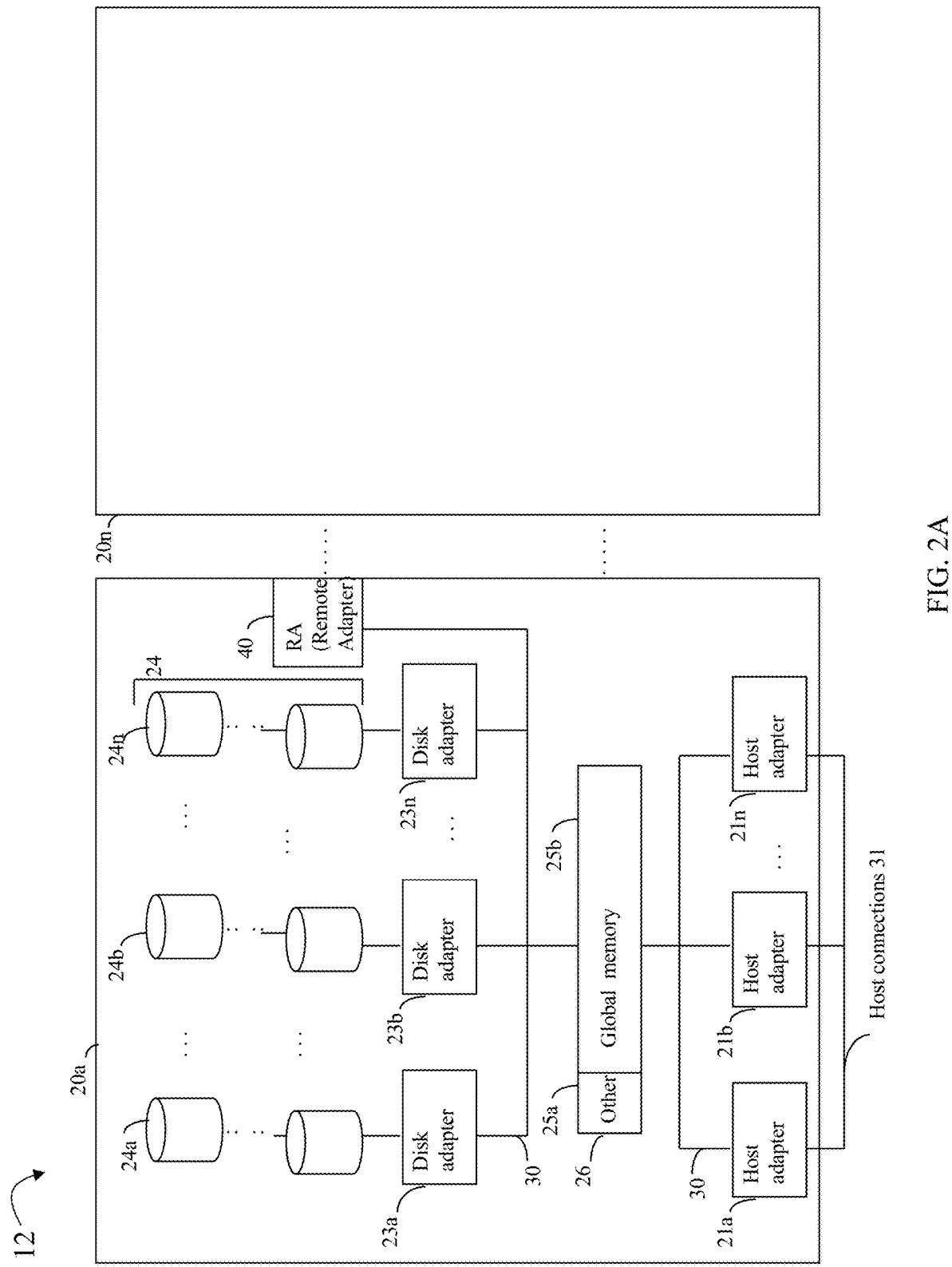
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
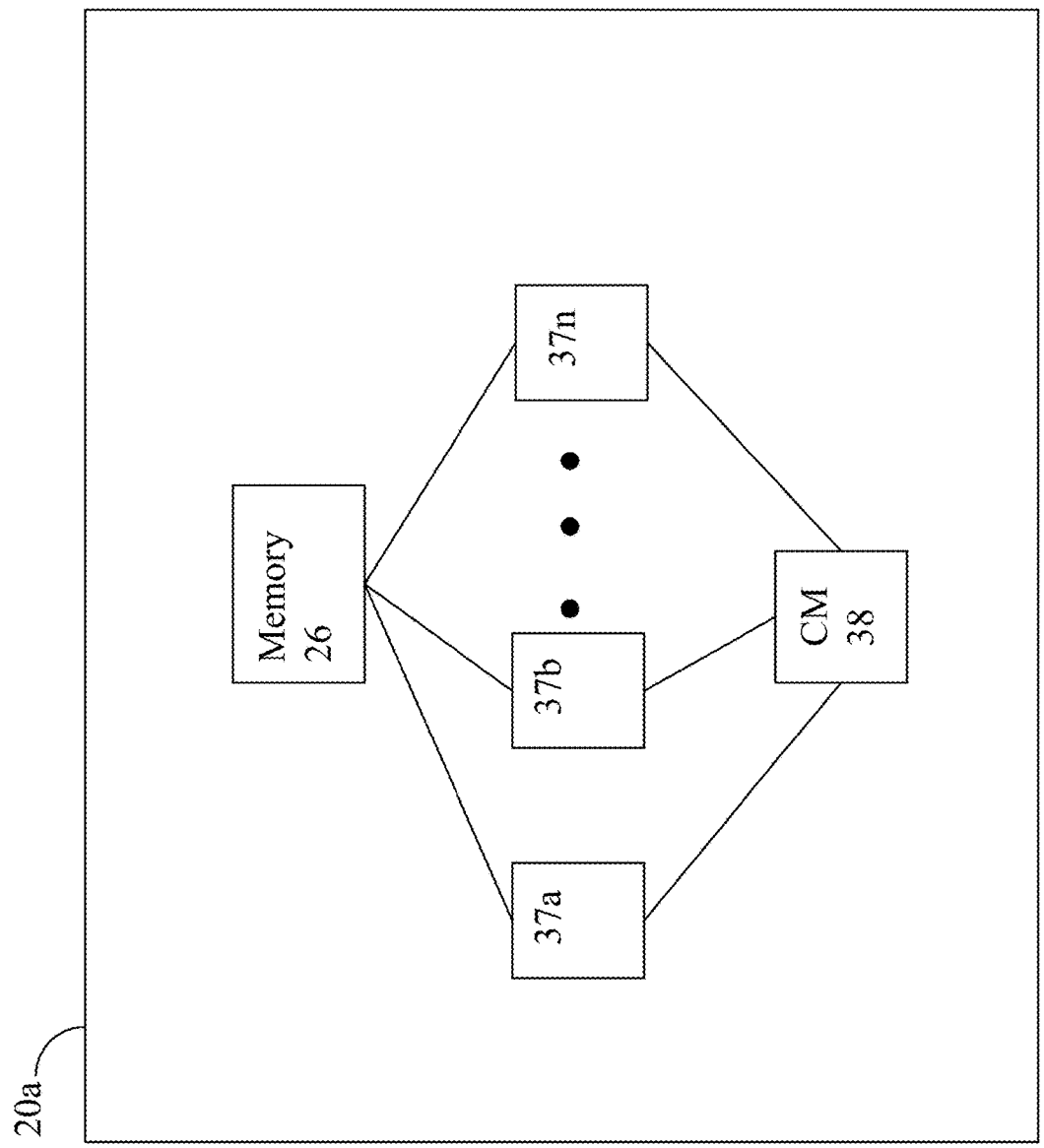
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression. In at least one embodiment, the data services may include local and/or remote data replication services.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In connection with a data storage system management application, or more generally any application having a user interface (UI) such as a graphical UI, a developer generally has to develop, test and maintain code for the UI. For example, a developer may be tasked with creating a view that displays a data storage system dashboard populated with various information, for example, regarding the data storage system I/O performance; regarding performance, resource utilization or consumption, or other information about physical and/or logical storage entities or objects (e.g., SGs, cache metrics (e.g., cache hit ratio; amount of cache consumed for write pending (WP) cached data), host I/O rate and data transfer rate, backend I/O rate) of the data storage system, and the like. In such a case, the developer is responsible for writing code that defines and maintains all components or elements of view rendered in the UI. For example, assume a table or chart is rendered in the view to display information to a user of the data storage system management application regarding aspects of performance of the data storage system. In such a case, the developer may write code that constructs and initializes data structures for the tables or charts, requests necessary data from the data storage system or server where the data is used to populate the tables or charts, implement polling or other technique used to obtain revised data used to refresh the tables or charts periodically, implementing the visual aspects of the rendered charts and tables (e.g., attributes related to the look and feel and styling of the charts and tables when rendered in the UI), and the like. Thus, the developer typically manually writes code to perform the various tasks for the often numerous rendered views of charts and tables.

Described in following paragraphs are techniques that may be used to specify a reusable interface component that may automatically perform desired tasks, some of which are noted above, that are typically performed during the lifecycle of components of the views of the UI. In at least one embodiment, a dashboard component may be provided, via an application programming interface (API), to code of a library that automatically performs desired tasks associated with rendering a view of the UI including the component. In this manner, the same code of the library may be reused in connection with multiple components to perform the desired tasks for rendering numerous different views of the UI. Additionally, use of the library embodying the desired tasks performed when rendering the components in view of the UI provides a layer of abstraction for the developer. The developer does not need to have intimate knowledge regarding the particular implementation of such tasks. Furthermore, embodying the reusable code for the component into a library accessed via API calls insulates developers from any detailed implementation changes. For example, the code of the library may be modified to use a revised querying interface needed to issue calls to the data storage system to obtain desired data used to populate the charts and tables of the rendered views. However, the API calls to the library made in developer code may remain unchanged.

In at least one embodiment in accordance with the techniques herein, the library code may perform tasks in connection with a component, for example, including: initially retrieving data from the data storage system used to populate the component with a view of the UI; subsequently polling the data storage system at proper periodic time intervals to obtain revised or updated information used to refresh displayed data of the component; providing support for time frame change management (e.g., updates made to a desired timeframe or time window for which data is requested from the data storage system); providing support for component layout and layout management; providing additional features such as synchronization of multiple charts within a single component; and providing a common visual styling, look and feel for the components when rendered in the UI. In at least one embodiment, the component may also be referred to as a dashboard component which may include a table or multiple charts.

The following paragraphs provide an example embodiment using the techniques herein with respect to GUI of a storage management application. However, more generally, the techniques described in following paragraphs may be used in connection with any suitable UI. In at least one embodiment in accordance with the techniques herein, the data storage system management application may execute in the context of a browser where information of the UI is displayed or rendered within the browser windows.

Figure 3A:
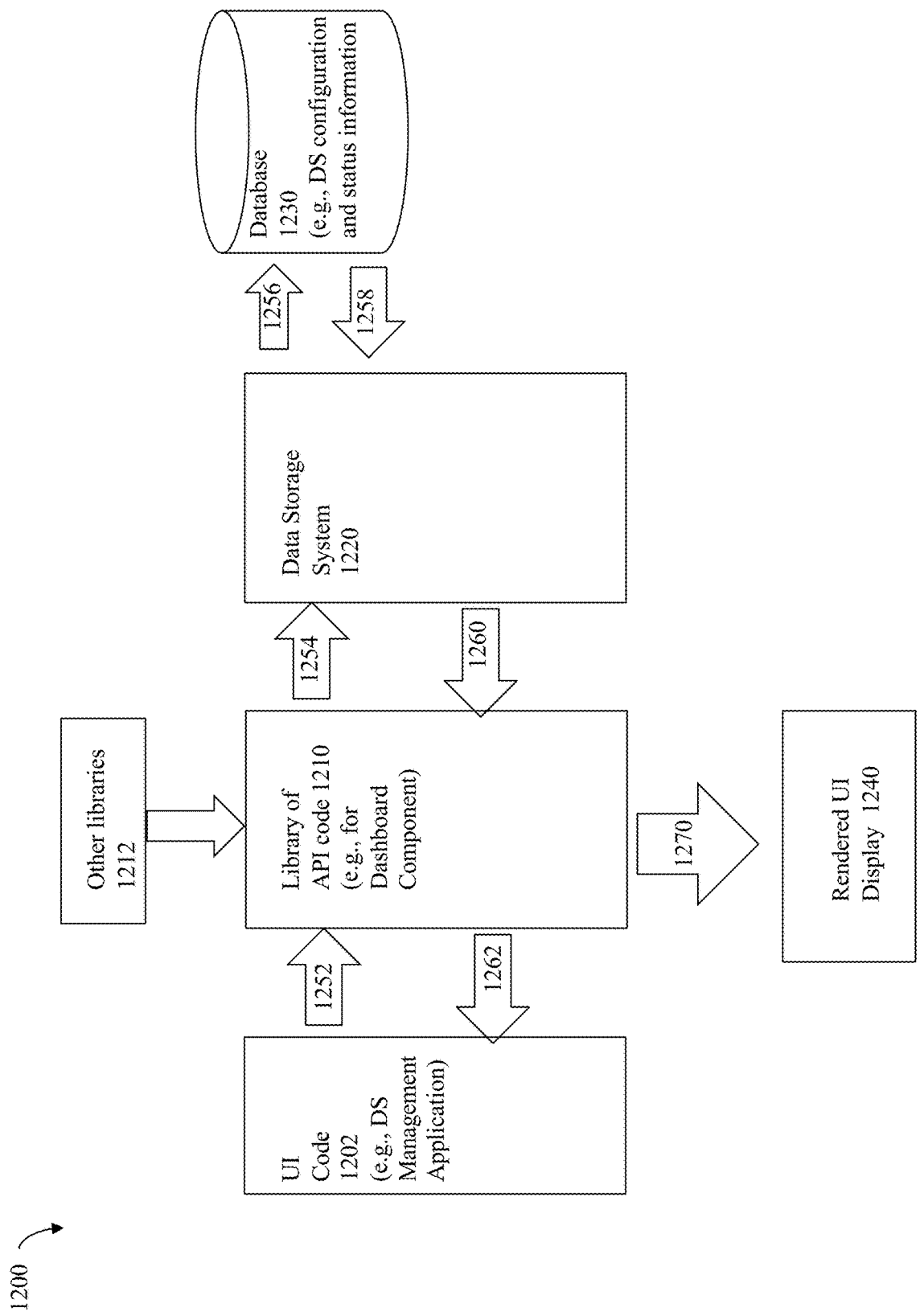
FIG. 3A is an example of elements including systems, data and code that may be used in at least one embodiment in accordance with the techniques herein.

Referring to FIG. 3A, shown is an example of elements including systems, data and code that may be used in at least one embodiment in accordance with the techniques herein. The example 1200 includes UI code 1202, a library 1210 including code for the various APIs used by the UI code 1202, other supporting libraries 1212 used by code of the library 1210, a data storage system 1220, a database 1230 and a rendered UI display or view 1240.

The UI code 1202 may be code generated by a developer of the data storage management application. Consistent with discussion elsewhere herein, the UI code 1202 may issue one or more API calls 1252 invoking code of the library 1210. For example, the UI code 1202 may issue an API call to create an instance of a component, such as a component including multiple charts, included in a rendered UI display 1240. The code of the library 1210 may perform one or more of the desired tasks as described herein with respect to the component. For example, the code of the library 1210 may handle making an initial request or query 1254 to the data storage system 1220 requesting an initial set of data used to populate the charts of the component. Subsequently, the data storage system 1220 may issue one or more requests 1256, such as database queries, to the database 1230 to obtain the requested initial set of data. In at least one embodiment, the database 1230 may be stored on the data storage system 1220. As a variation, the database 1230 may be located on a different system, such as at a different location accessible via a network connecting the data storage system 1220 and the database 1230. The initial set of data requested may be returned 1258 from the database 1230 to the data storage system 1220, and then further returned 1260 to the library 1210. The library 1210 may handle rendering the initial set of data for the charts of the component in the UI display or view 1240. As may be suitable depending on the particular API call issued 1252 to the library 1210, the library 1210 may also return 1262 information to the UI code 1202.

The database 1230 may generally include information about the data storage system 1220. For example, in at least one embodiment, the database 1230 may include data storage system configuration, performance, and status information. For example, the database 1230 may include configuration information regarding the various physical and logical storage objects or entities in the data storage system (e.g., configured SGs, provisioned LUNs, configured RAID groups). The database 1230 may, for example, identify what LUNs are included in an SG, what one or more RAID groups the LUNs have storage provisioned from, what physical storage devices are included in each RAID group configuration, the particular RAID level of a RAID group, and what is the capacity of a LUN, what is the amount of used and free storage of SGs, LUNs, and RAID groups.

The database 1230 may include performance information, such as various performance metrics, regarding the physical and logical storage objects in the system 1220. For example, the database 1230 may include information regarding I/Os such as host or front end I/O rate, host or front end I/O data transfer rate or bandwidth (e.g., MBs/second), backend (BE) I/O rate, BE data transfer rate or bandwidth, utilization of different physical components of the system (e.g., cache utilization, HA utilization DA utilization), cache hit ratio or rate, and amount of cache consumed for WP data waiting to be destaged.

In connection with rendering the multiple charts of a component and performing other tasks with respect to the component, the library 1210 may use one or more other libraries 1212. For example, in at least one embodiment described herein, the library 1210 may implement synchronization among charts of the same component, and other chart-related functionality described herein, using the Highcharts® software library by Highsoft AS of Norway.

Additionally, code of the library 1210 may handle automatically performing other tasks described herein such as automatically polling the data storage system 1220 periodically for revised or updated information used to update and refresh displayed information of the charts of a component rendered in the UI display 1240.

In at least one embodiment, the library 1210 may be an object oriented library written in any suitable language, such as C, C++, Java, or any combination thereof. In at least one embodiment, the library 1210 may also define classes for use with the object oriented programming paradigm.

In at least one embodiment described herein for purposes of illustration, a component of a view rendered in the UI may include a single table or may include one or more charts. The charts of a single component may be one particular type of predefined chart types. A chart may generally refer to a graphical display of information. Visual aspects regarding how information of the chart is displayed may vary with the particular chart type selected. For example, the predefined chart types may include a line chart, bar chart, pie chart, and the like. The particular predefined chart types may vary with embodiment.

In at least one embodiment, API calls may be made to code for the library 1210 to instantiate a component of a rendered UI view or display 1240. The following is an example HTML snippet of a first API call made from UI code 1202 to the library 1210 to instantiate a table dashboard component. In such an embodiment, a table dashboard component may include a single table. However, more generally, such techniques herein may be readily extended for use with a table dashboard component including more than a single table.

```
<spa-dashboard dashboard="tableDashboard"
    spa-time-frame-model="spaTimeFrameModel">
</spa-dashboard>
``` where

"tableDashboard" is a data structure including various fields of metadata and data for the table and the component instantiated; and "spaTimeFrameModel" identifies an initial setting for the time frame or time window for which data is requested.

For example, the time frame or time window may be 24 hours, a number of days, and the like, which denotes an amount of time for which data is requested. For example, a chart may display, in an ongoing continuous manner, a particular metric for a prior 24 hour time period where the 24 hour time period is denoted by the time frame parameter, spaTimeFrameModel. An example of the data structure tableDashboard is described in more detail elsewhere herein.

The following is an example HTML snippet of a second API call made from UI code 1202 to the library 1210 to instantiate a chart dashboard component including one or more charts:

```
<spa-dashboard dashboard="chartDashboard"
    spa-time-frame-model="spaTimeFrameModel"
    charts-synchronized="chartsSynchronized"
    number-of-columns="numberOfChartColumns">
</spa-dashboard>
``` where

"chartDashboard" is a data structure including various fields of metadata and data for the one or more charts and the component instantiated;

"spaTimeFrameModel" identifies an initial setting for the time frame or time window for which data is requested, as described above;

chartsSynchronized is a boolean indicating an initial setting of whether the charts of component are synchronized; and numberOfChartColumns is a numeric integer value that specifies the number of columns of the component layout for the charts of the component instantiated.

An example of the data structure chartDashboard is described in more detail elsewhere herein.

In connection with the API parameter chartsSynchronized, in at least one embodiment in which the component includes multiple charts, the charts of the same component may be synchronized or unsynchronized. When synchronized, a user interaction or event of a predefined type may be made with respect to a single one of the charts of the same component. In response to the interaction or event, all remaining charts of the same component are also reflect or respond in a manner similar to that as performed with respect to the single chart. In one aspect, the user event or interaction actually performed in the single chart of the component is also emulated in the remaining charts of the same component. When unsynchronized, no such emulation is performed in the remaining charts of the same component responsive to the user vent or interaction only performed in the single chart of the component. In at least one embodiment, an attribute may be included in metadata at the component level for a chart component where the attribute may identify a current setting of whether charts of the component are synchronized or not at a particular point in time. In at least one embodiment, the UI may include selectable UI controls to further modify the synchronization attribute between synchronized and unsynchronized at various points in time as desired during execution of the data storage management application.

In connection with the API parameter numberOfChartColumns, the windows of the component are included in a layout having the numberOfChartColumns, N. Generally, the UI view or display in which a component is rendered may be partitioned to include N columns and a suitable number of rows to display the windows.

It should be noted that APIs used in embodiment may include other parameters in addition to those noted herein.

Figure 3B:
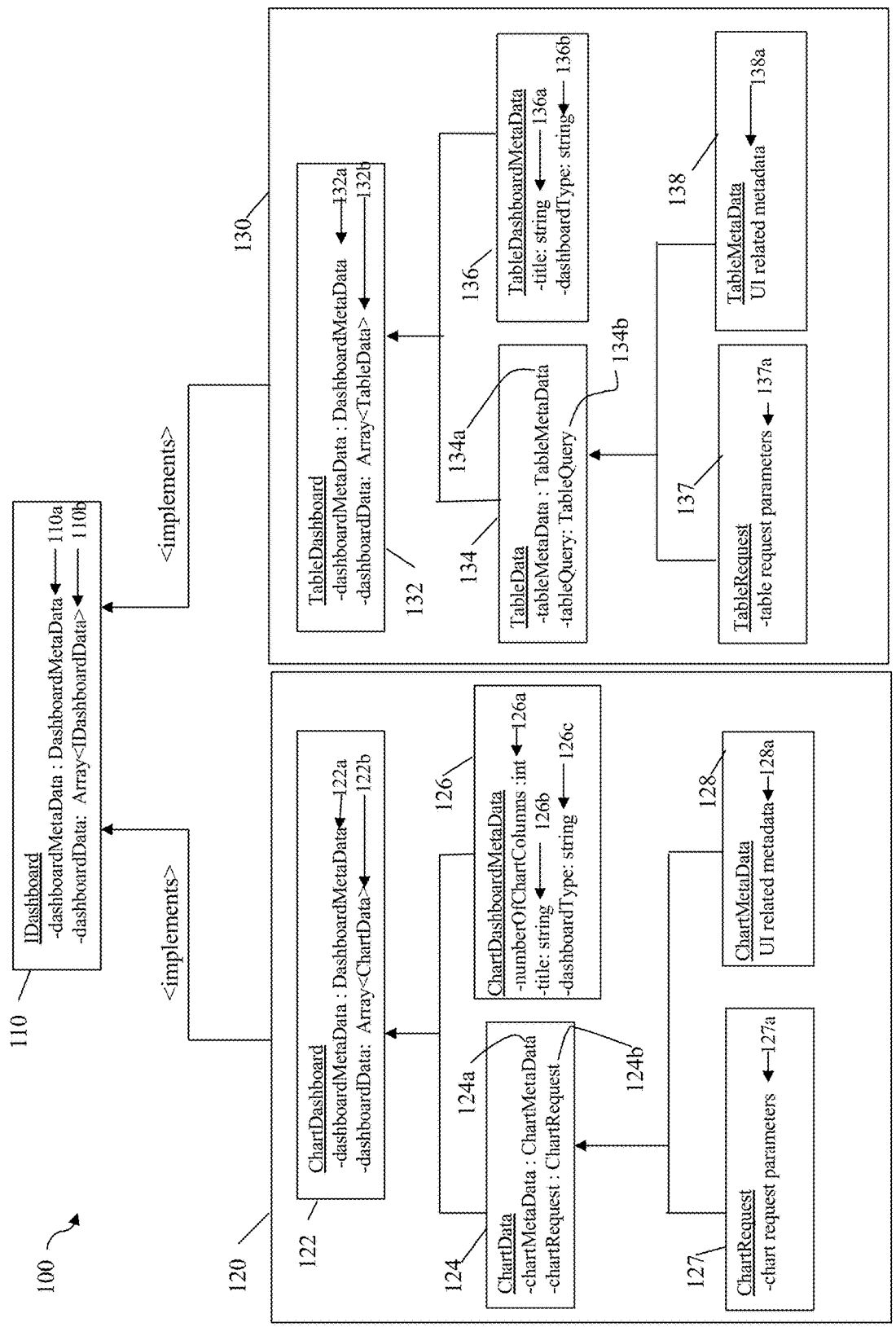
FIG. 3B is a hierarchical representation of dashboard component structures that may be used in an embodiment in accordance with the techniques herein.

Referring to FIG. 3B, shown is a hierarchical representation 100 of dashboard component structures that may be used in an embodiment in accordance with the techniques herein.

Each of the elements 110, 122, 124, 126, 127, 128, 132, 134, 136, 137 and 138 has a general format including an underlined class at the top along with one or more fields when an object of that class is instantiated. Some fields have a general format of "variable: type" where type denotes the data type of the particular variable or field name.

Element 110 indicates that the interface class IDashboard comprises dashboardMetaData 110a and dashboardData 110b. The dashboardMetaData 110a includes component level metadata such as, for example, the title of the dashboard component, as well as other metadata particular to the particular type of component including a table or one or more charts. The dashboardData 110b in at least one embodiment may be an array including an element for each table or chart of a component. For example, consistent with discussion elsewhere herein where a component includes 4 charts, the element 110b may be an array including 4 cells or entries, one including further metadata and data specific to a particular corresponding one of the 4 charts.

Generally, an instance of a dashboard component created with 110 as a result of the first API call described above creates a table component represented by 130. An instance of a dashboard component created with 110 as a result of the second API call described above creates a chart component represented by 120.

Element 122 indicates that the interface class ChartDashboard comprises dashboardMetaData 122a and dashboardData 122b. The dashboardMetaData 122a for a chart component 120 includes the metadata denoted by elements 126 and 128. The dashboardData 122b for a chart component 120 includes the data denoted by elements 124 and 127.

Element 126 indicates that the interface class ChartDashboardMetadata includes component level metadata such as, for example, the title 126b of the dashboard component, as well as other metadata particular to the particular chart component. For example, the metadata of 126 for the component-level may include field 126a, the number of columns, N, for the layout of the charts as described above. Field 126c may be a string identifying the dashboard type as a chart. Element 126 indicates metadata applicable to the entire component and all charts in the chart component. For example, the following is an example information that may be included in the second API call corresponding to element 126 for a chart component:

```
"dashboardMetaData": {
    "numberOfChartColumns": { /* corresponds to 126a */
        "numeric": 2
    },
    "title": "Array Dashboard", /* corresponds to 126b */
```

```
    "type": "CHART",        /* corresponds to 126c */
}
```

Element 124 indicates that the interface class ChartData includes chart-specific metadata 124a and chart-specific request information 124b. Generally, element 124 indicates the information that may comprise one element, entry or cell of the array denoted by 110b and 122b when the component is a chart dashboard component. The chart-specific metadata of 124a is further defined by element 128 with the interface class ChartMetadata. The chart-specific data of 124b is further defined by element 127 with the interface class ChartRequest.

The chart-specific metadata, as represented by 124a and 128, for one particular chart of the component may, for example, identify the particular predefined type of the chart (e.g., line chart, bar chart, or pie chart); identify various informational text displayed as a label, subtitle or title for the chart; and indicate a default initial setting as to whether the chart is minimized or maximized when rendered in the component. In the foregoing chart-specific metadata, the informational text may, for example, identify labels used for the X and/or Y axis of a chart that is a 2 dimensional graph, and identify a title for the chart.

The chart-specific request information, as represented by 124b and 127, may identify request parameters 127a, such as the various metrics, used in connection with requests for information issued from the library 1210 to the data storage system 1220, and from the system 1220 to the database 1230, in order to obtain desired information used to populate a particular chart. For example, assume a chart dashboard component includes 2 charts A and B. Chart A may display a first performance metric for the last 24 hour time period. A first set of chart-specific request information 124b for Chart A may indicate to query the system 1220 and the database 1230 for the first performance metric at each polling interval, such as every 5 minutes. Chart B may display a second performance metric for the last 24 hour time period. A second set of chart-specific request information 124b for Chart B may indicate to query the system 1220 and the database 1230 for the second performance metric at each polling interval, such as every 5 minutes. Thus, the chart-specified request information 124b, 127 is used to formulate the requests or queries issued, for example, to obtain the initial set of information used to populate a particular chart as well as to obtain updated or revised sets of information at periodical polling intervals to repopulate and update the information displayed in the particular chart.

The following is an example information that may be included in the second API call corresponding to chart-specific metadata 124a, 128 for a single chart in a chart component:

```
"chartMetaData": {
    "chartType": "Timeline",  /* indicates the chart is a timeline chart */
    "chartStyle": "LINE",     /* data is displayed as a line */
    "maximized": false,       /* indicates default setting the chart is not maximized or
    "minimized": false,       /*    minimized */
    Array identifying particular points in time used to plot the line of values for a first metric;
    "name": "% Cache WP", /* character string used as a label for the name of the first metric
    "subtitle": "0128", /* chart subtitle */
```

-continued

```
    "title": "Chart 1" /* chart title */
}
```

The above chart-specific metadata example for a single chart indicates that the chart is a line chart that displays values for the performance metric having the label "name"="% Cache WP", denoting the percentage or amount of cache used to store WP data.

The following is an example information that may be included in the second API call corresponding to chart-specific request information 124b, 127 for a single chart in a chart component:

```
"chartRequest": {
    "aggregateType": "INTERVAL", /* queries are requesting data for a
defined time interval */
    "arrayId": "000197800128", /* identifies the data storage system to
be queried */
    "category": "ARRAY",    /* identifies the category level the query
*/
    "endDate": {            /* encoded end date of time interval for
requested data */
        "numeric": 1557479668474,
        "longAsString": "1557479668474"
    },
    "metrics": [            /* metrics requested in the query for the
time interval */
        "TOTAL_CACHE_UTILIZATION",
        "PERCENT_HIT"
    ],
    "startDate": {          /* encoded start date of time interval for
requested data */
        "numeric": 1557393268474,
        "longAsString": "1557393268474"
    },
    "statsAttributes": [    /* indicates to query for the average
metric values */
        "AVG"
    ]
```

The above chart-specific request information 124b, 127 example for a single chart indicates to issue a query for two cache related metrics, "TOTAL_CACHE_UTILIZATION", and "PERCENT_HIT" (e.g., cache hit ratio or percentage).

Element 132 indicates that the interface class Table Dashboard comprises dashboardMetaData 132a and dashboardData 132b. The dashboardMetaData 132a for a table component 130 includes the metadata denoted by elements 136 and 138. The dashboardData 132b for a table component 130 includes the data denoted by elements 134 and 137.

Element 136 indicates that the interface class TableDashboardMetadata includes component level metadata such as, for example, the title 136a of the dashboard component, as well as other metadata particular to the particular chart component. Field 136b may be a string identifying the dashboard type as a table. Generally, element 136 indicates metadata applicable to all one or more tables for the entire component. For example, the following is an example information that may be included in the first API call corresponding to element 136 for a table component:

```
"dashboardMetaData": {
    "title": "All SG Overview",   /* corresponds to 136a */
    "type": "TABLE",              /* corresponds to 136b */
}
```

Element 134 indicates that the interface class TableData includes table-specific metadata 134a and table-specific request information 134b. Generally, element 134 indicates the information that may comprise one element, entry or cell of the array denoted by 110b and 132b when the component is a table dashboard component. The table-specific metadata of 134a is further defined by element 138 with the interface class TableMetadata. The table-specific data of 134b is further defined by element 137 with the interface class TableRequest.

The table-specific metadata, as represented by 134a and 138, for one particular chart of the component may, for example, identify various informational text displayed as a label, subtitle or title for the table; and indicate a default initial setting as to whether the table is minimized or maximized when rendered in the component.

The table-specific request information, as represented by 134b and 137, may identify request parameters 137a, such as the various metrics, used in connection with requests for information issued from the library 1210 to the data storage system 1220, and from the system 1220 to the database 1230, in order to obtain desired information used to populate a particular table. For example, assume a table dashboard component includes table A that displays a first performance metric for the last 24 hour time period. A first set of table-specific request information 134b for Table A may indicate to query the system 1220 and the database 1230 for the first performance metric at each polling interval, such as every 5 minutes. Thus, the table-specified request information 134b, 137 is used to formulate the requests or queries issued, for example, to obtain the initial set of information used to populate a particular table as well as to obtain updated or revised sets of information at periodical polling intervals to repopulate and update the information displayed in the particular table.

The following is an example information that may be included in the first API call corresponding to table-specific metadata 134a, 138 for a single table in a table component:

```
{
    "metaData": {
        "maximized": false, /* indicates the table is not initially maximized
        "minimized": false,    or minimized */
        "subtitle": null,   /* no subtitle provided */
        "title": "Storage Groups - Event Correlation", /* table title */
        "type": "HW_TABLE"  /* identifies a particular type of table
*/
    },
```

The following is an example information that may be included in the first API call corresponding to table-specific request information 134b, 137 for a single table in a table component:

```
query": {
    "aggregateType": "INTERVAL", /* queries are requesting data for a defined time interval*/
    "category": "SG",   /* identifies the category level the query with respect to SGs */
    "endTime": {        /* encoded end date of time interval for requested data */
        "numeric": 1335113457130,
        "longAsString": "1335113457130"
    },
```

```
    "metrics": [            /* 3 metrics to request in the query */
       "ID",
       "RESPONSE_TIME",
       "IO_RATE",
    ],
    "startTime": {          /* encoded start time for requested data */
       "numeric": 1335099057130,
       "longAsString": "1335099057130"
    },
    "statsAttributes": [
       "AVG"                /* indicates to query for the average metric values */
    ],
    "arrayId": "000197800128"    /* identifies the data storage system for which the metrics
are requested */
    }
} /*dashboarddata
```

The above table-specific request information 134b, 137 example for a single table indicates to issue a query for three SG related metrics, "ID" (e.g., of each of the SGs), "RESPONSE_TIME", and "IO_RATE". In at least one embodiment, the table displayed may have a layout automatically determined. For example, the table may have a number of columns based on the number of requested metrics, where a single column may include values for a single metric for a single polling period. Additionally, the number of rows in the table may be automatically determined based on the data stored in the table. For example, if a table includes 3 metrics of information for each SG in a particular data storage system, the table may have 4 columns—one with the SG identifier and 3 columns for the 3 metrics. The table may have a number of rows equal to the number of SGs in the system. In at least one embodiment, not all information of table may be displayed in the view of the UI at a point in time. For example, the table view may include a number of rows selected based on default predetermined sizes of rows, columns and entries in the table. The UI view of the table may include a scroll bar where the user may scroll through the table and view different rows of the table in a particular portion of the table mapped to the view of the table.

Figure 4A:
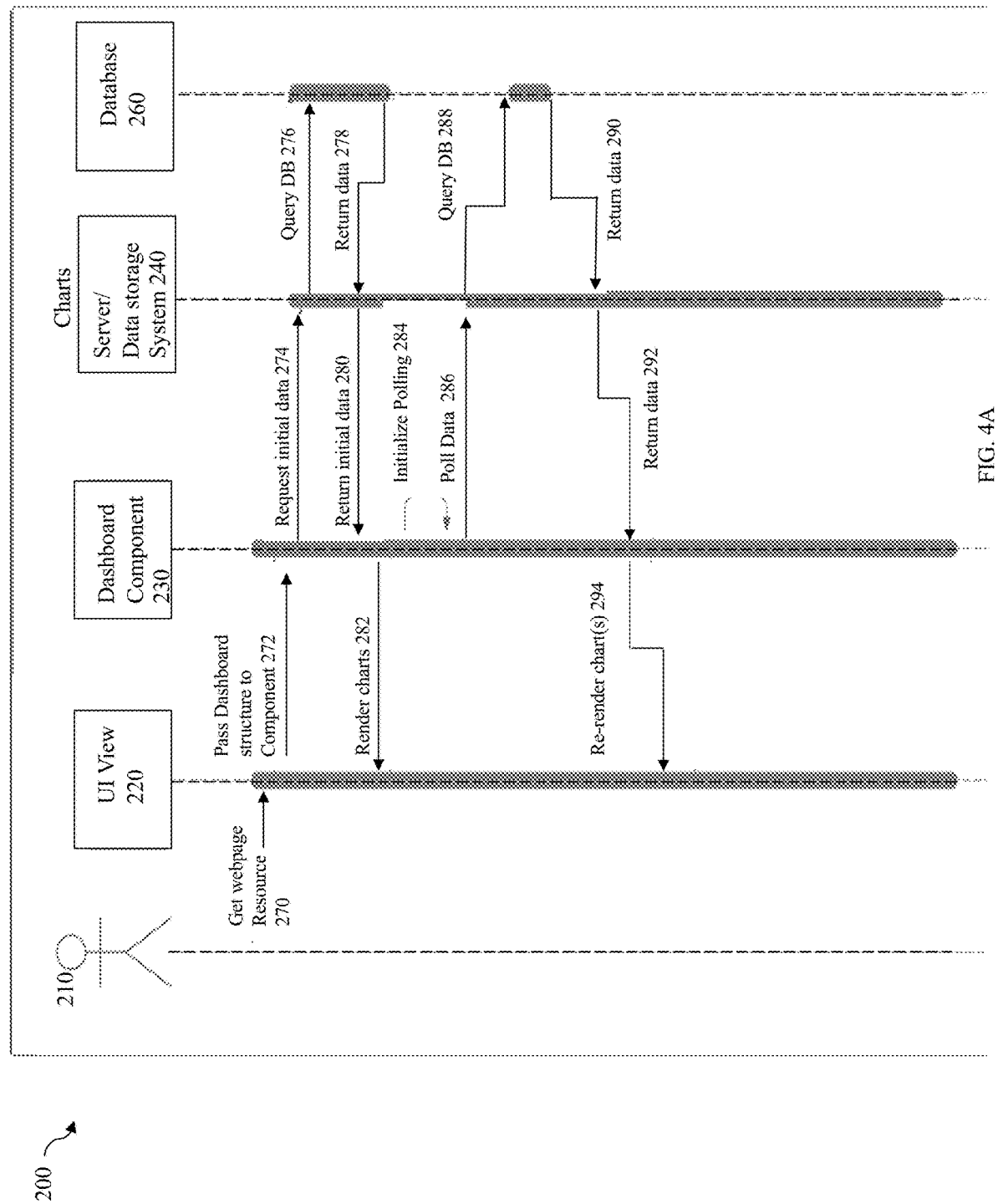
FIGS. 4A, 4B, 5 and 6 are examples illustrating interactions between various elements to perform different tasks in an embodiment in accordance with the techniques herein.

Referring to FIG. 4A, shown is a diagram illustrating the interactions between the various elements included in an embodiment in accordance with the techniques herein. The example 200 illustrates the flow between such elements when rendering a chart dashboard component corresponding to 120 of FIG. 3B.

A user 210 of the data storage system management application may perform an operation that results in retrieving a webpage 270. In order to render the UI view 220, an API call is made 272 which passes the dashboard structure and other information of the API to the dashboard component 230 (e.g., included in the library 1210). The component 230 initiates the request for the initial data 274 to the server or data storage system 240. In response, the server 240 then queries (276) the database 260. In response to the queries 276, the database 260 returns the requested data 278 to the server 240. Subsequently, the server 240 then returns the requested initial data 280 to the dashboard component 230. Once the initial data 280 is obtained, the component 230 then renders the charts 282 containing the initial data in the UI view 220.

Additionally, the component 230 initializes periodic polling 284. As described herein, the component 230 may periodically poll 286 the server 240 for revised or updated data used to repopulated and refresh the charts of the component. In response to receiving the polling request 286, the server 240 queries the database 288. The database 288 then returns the requested data 290 to the server 240. The server 240 then returns the requested data 292 to the component 230. Once the component 230 received the data 292, the component 230 performs processing to re-render the one or more charts 294 in the UI view 220.

Figure 4B:
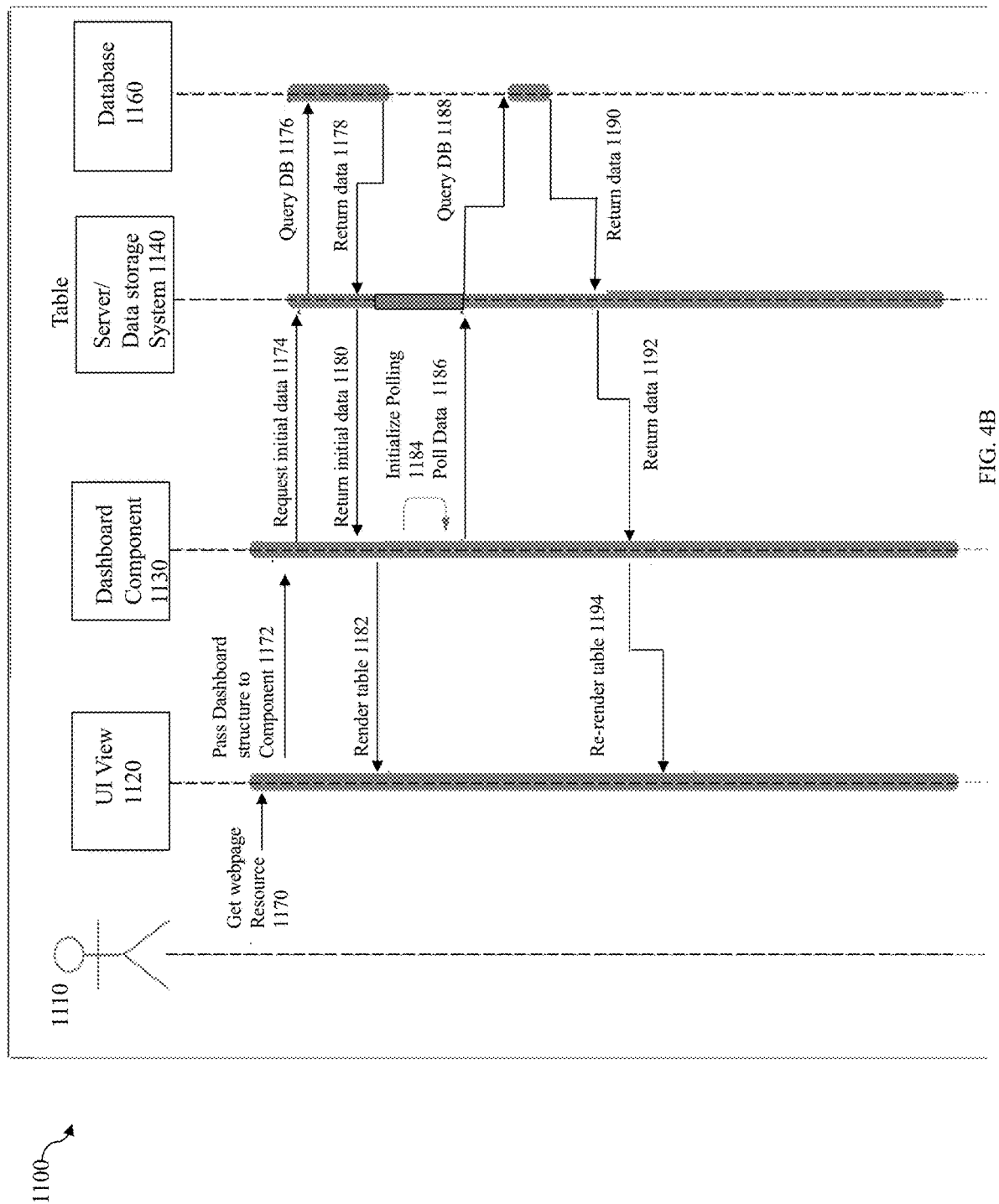

Referring to FIG. 4B, shown is a diagram illustrating the interactions between the various elements included in an embodiment in accordance with the techniques herein The example 1100 illustrates the flow between such elements when rendering a table dashboard component corresponding to 130 of FIG. 3B. The data flow and interactions of FIG. 4B are similar to those described above in connection with FIG. 4A.

A user 1110 of the data storage system management application may perform an operation that results in retrieving a webpage 1170. In order to render the UI view 1120, an API call is made 1172 which passes the dashboard structure and other information of the API to the dashboard component 1130 (e.g., included in the library 1210). The component 1130 initiates the request for the initial data 1174 to the server or data storage system 1140. In response, the server 1140 then queries (1176) the database 1160. In response to the queries 1176, the database 1160 returns the requested data 1178 to the server 1140. Subsequently, the server 1140 then returns the requested initial data 1180 to the dashboard component 1130. Once the initial data 1180 is obtained, the component 1130 then renders the table 1182 containing the initial data in the UI view 1120.

Additionally, the component 1130 initializes periodic polling 1184. As described herein, the component 1130 may periodically poll 1186 the server 1140 for revised or updated data used to repopulated and refresh the table of the component. In response to receiving the polling request 1186, the server 1140 queries the database 1188. The database 1188 then returns the requested data 1190 to the server 1140. The server 1140 then returns the requested data 1192 to the component 1130. Once the component 1130 receives the data 1192, the component 1130 performs processing to re-render the table 1194 in the UI view 1120.

Figure 5:
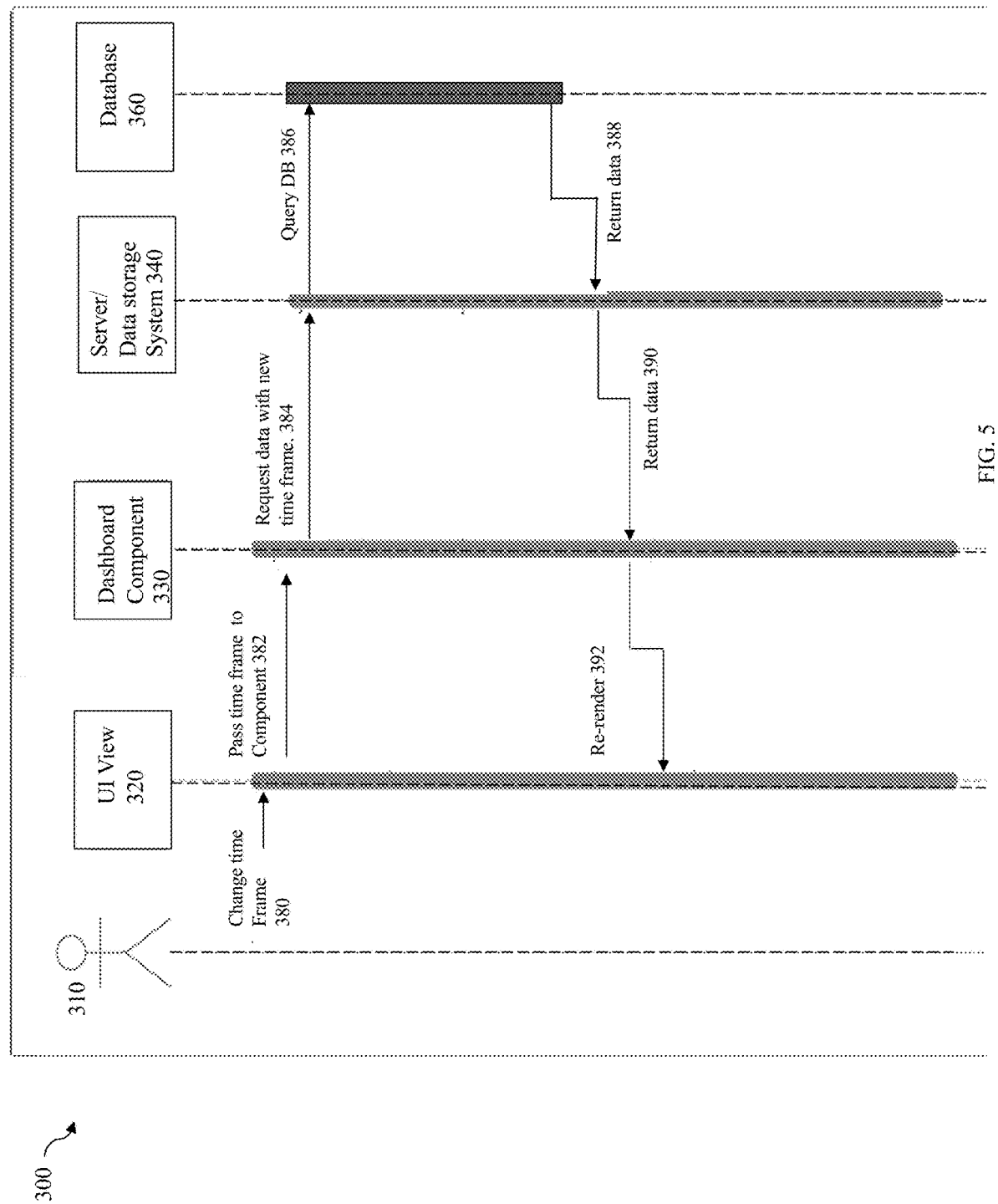

Referring to FIG. 5, shown is a diagram illustrating the interactions between the various elements included in an embodiment in accordance with the techniques herein The example 300 illustrates the flow between such elements responsive to a request to change or update the time frame used for a particular instance of a dashboard component that is a table component or a chart component. In at least one embodiment, the time frame may be dynamically modified via the UI, such as by a user request when the management application is running. The flow of FIG. 5 illustrates processing that may be performed responsive to such a request to change the time frame.

A user 310 of the data storage system management application may issue a request, via selection of a user interface element of the UI view 320, to change or update the time frame 380. The revised time frame is passed 382 from the UI view 320 to the component 330. In at least one embodiment in which the component 330 is included in the library 1210 as described herein, the revised time frame may be passed 382 to the component via an API call to the library 1210.

In response to receiving the revised time frame 382, the component 330 may update component level metadata denoting the current time frame and then request data 384 with the new time frame. The component 330 may issue the request 384 to the server 340 which, in turn, issue a query 386 to the database 360. The database 360 returns the requested data 388, based on the new time frame, to the server 340. The server 340 then returns the data 390 to the component 330. The component 330 re-renders 392 the component including the new data returned 390.

Figure 6:
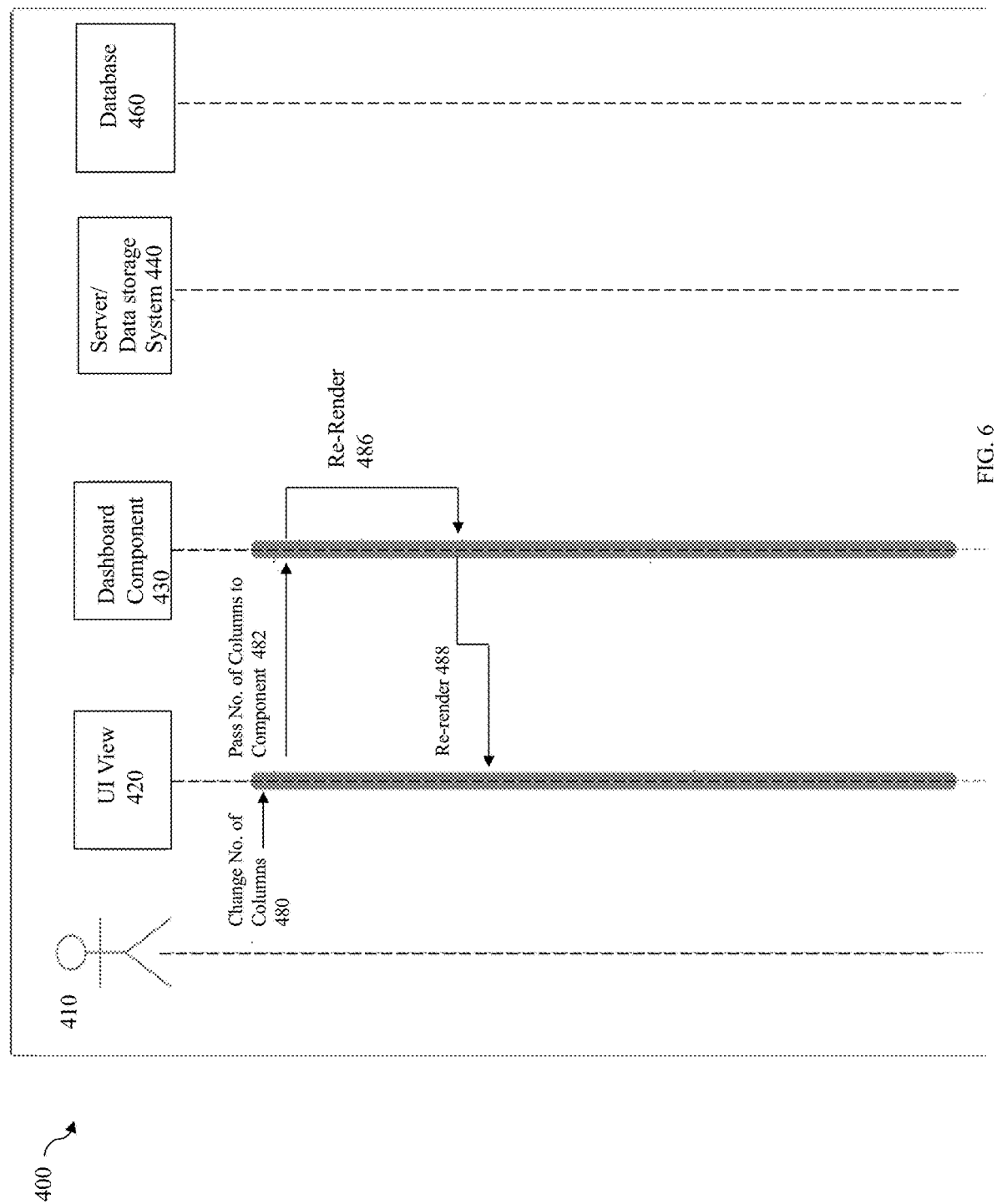

Referring to FIG. 6, shown is a diagram illustrating the interactions between the various elements included in an embodiment in accordance with the techniques herein The example 400 illustrates the flow between such elements responsive to a request to change or update the layout of a chart dashboard component. In at least one embodiment, the number of columns of the layout of the charts may be dynamically modified via the UI, such as by a user request when the management application is running. The flow of FIG. 6 illustrates processing that may be performed responsive to such a request to change the number of columns in a chart component.

A user 410 of the data storage system management application may issue a request, via selection of a user interface element of the UI view 420, to change or update the number of columns 480. The revised number of columns is passed 482 from the UI view 420 to the component 430. In at least one embodiment in which the component 430 is included in the library 1210 as described herein, the revised number of columns for the chart component may be passed 482 to the component via an API call to the library 1210.

In response to receiving the revised number of columns 482, the component 430 may update component level metadata denoting the current number of columns. The component 430 then re-renders 488 the chart component using the revised layout based on the revised number of columns from 480, 482.

What will now be described is behavior and processing performed in connection with the chart dashboard component in an embodiment in accordance with the techniques herein. In at least one embodiment, charts that are displayed in a single component may be minimized where the selected chart that is minimized is removed from the general column layout of the charts. The one or more minimized charts may appear in a designated area of the UI display in a reduced iconic form that may subsequently be restored whereby the selected minimized chart is restored for inclusion in the layout area. A chart may also be maximized in the layout area where the single chart may be the only chart included in the layout area and all other charts of the component are then minimized. The foregoing and other aspects of using the minimizing features in connection with multiple charts in a single component are described in more detail in following paragraphs.

Figure 7A:
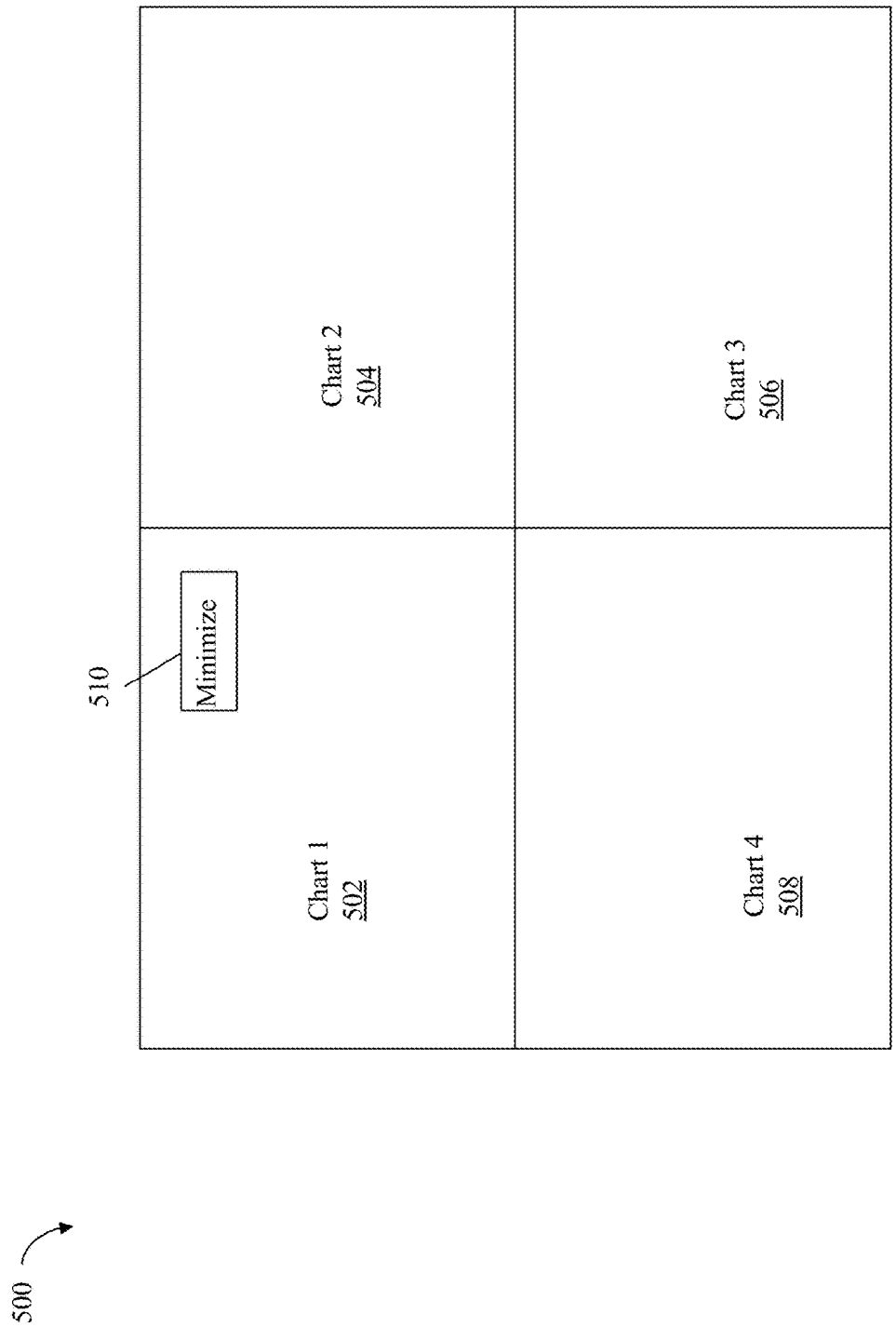

Referring to FIG. 7A, shown is an initial layout 500 of 4 charts of a single component in an embodiment in accordance with the techniques herein. The layout 500 includes charts 502, 504, 506 and 508 at a first point in time. The layout information for the chart component includes 2 columns whereby processing is performed to effectively tile or position each of the 4 charts in a 2 column arrangement as illustrated.

The UI element 510 may be selected to minimize chart 1 502. UI element 510 may be, for example, a button.

Figure 7B:
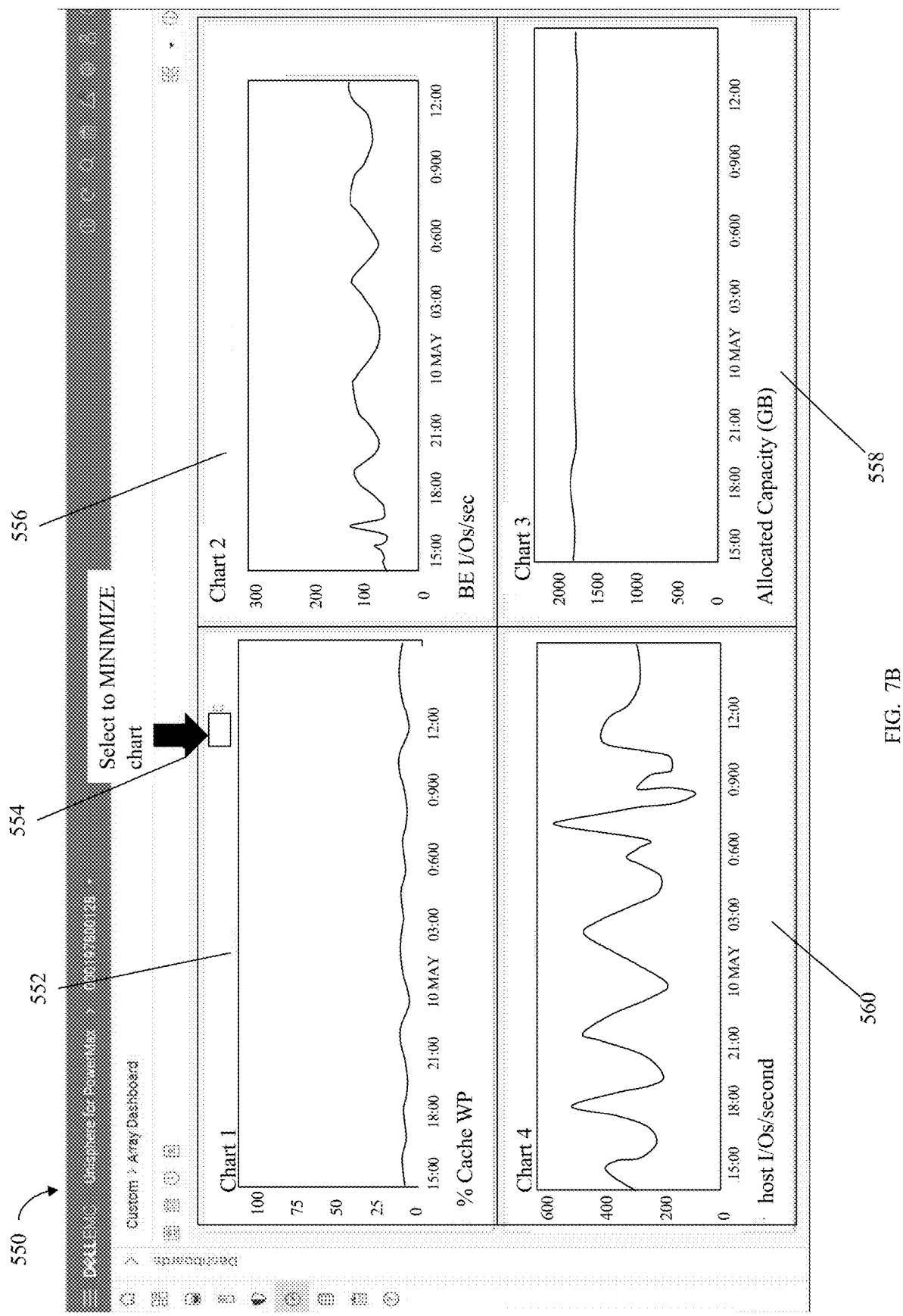

Referring to FIG. 7B, shown is a more detailed example 550 corresponding to the 4 charts of the single chart component having the layout of FIG. 7A. The example 550 includes 4 charts 552, 556, 558 and 560 similar to the 4 charts illustrated in FIG. 7A. The UI element 554 is similar to UI element 510 where UI element 554 may be selected to minimize chart 1 552.

At a second point in time, UI element 554 may be selected to minimize chart 1 552. Responsive to selecting UI element 554, the UI display 600 of FIG. 8A may be rendered.

In the FIG. 8A, responsive to minimizing the chart 1 552, processing may be performed to revise the layout and arrangement of the charts in the layout. In the example 600, the minimized chart 1 552 may be represented by an entry in the minimized charts area 608. Element 610 may denote a UI element that, when selected, restores the chart 1, where chart 1 is again included in the layout area and arrangement 601. As can be seen from the example 600, the minimized chart 1 is removed from the layout 601 as denoted by the empty cell or entry 601a in the layout.

Additionally, in the particular arrangement of the charts in the layout 601, it should be noted that the charts are arranged to fill the entries by populating the left-most column first. In this example, there are not enough non-minimized charts to populate each of the 4 chart entries or positions of the layout 601 so the layout positions are filled from the left-most column to the right-most column.

Figure 8B:
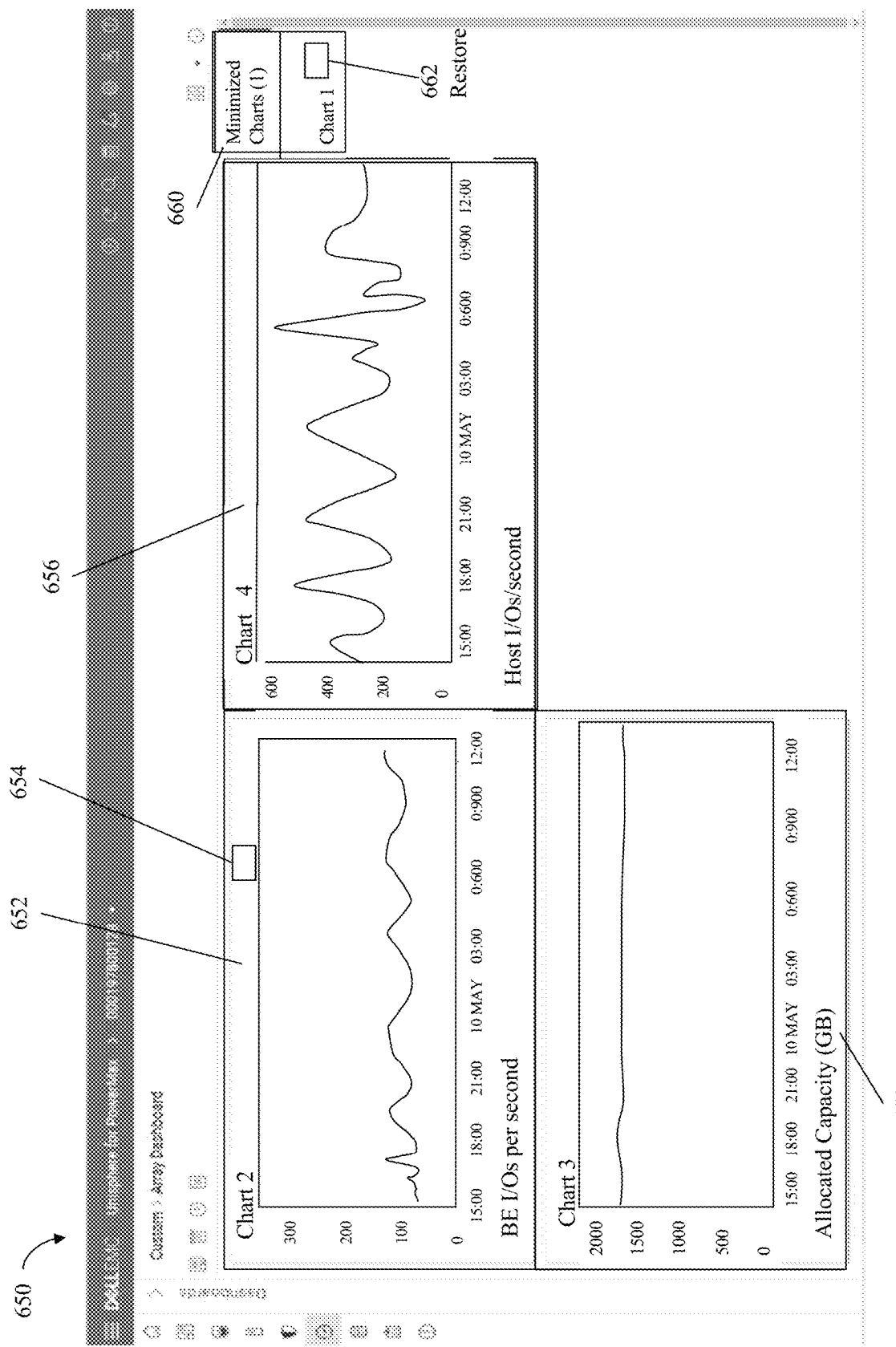

Referring to FIG. 8B, shown is a more detailed example 650 corresponding to the 1 minimized chart and the 3 non-minimized charts of the single chart component having the layout of FIG. 8A. The example 650 includes the 3 non-minimized charts 652, 656, and 658 similar to the 3 non-minimized charts illustrated in layout area 601 of the FIG. 8A. Elements 660 and 662 of FIG. 8B correspond, respectively, to elements 608 and 610 of FIG. 8A.

At a third point in time subsequent to the second point in time, UI element 654 may be selected to minimize charts 2 652. Responsive to selecting UI element 654, the UI display 700 of FIG. 9A may be rendered.

Figure 9A:
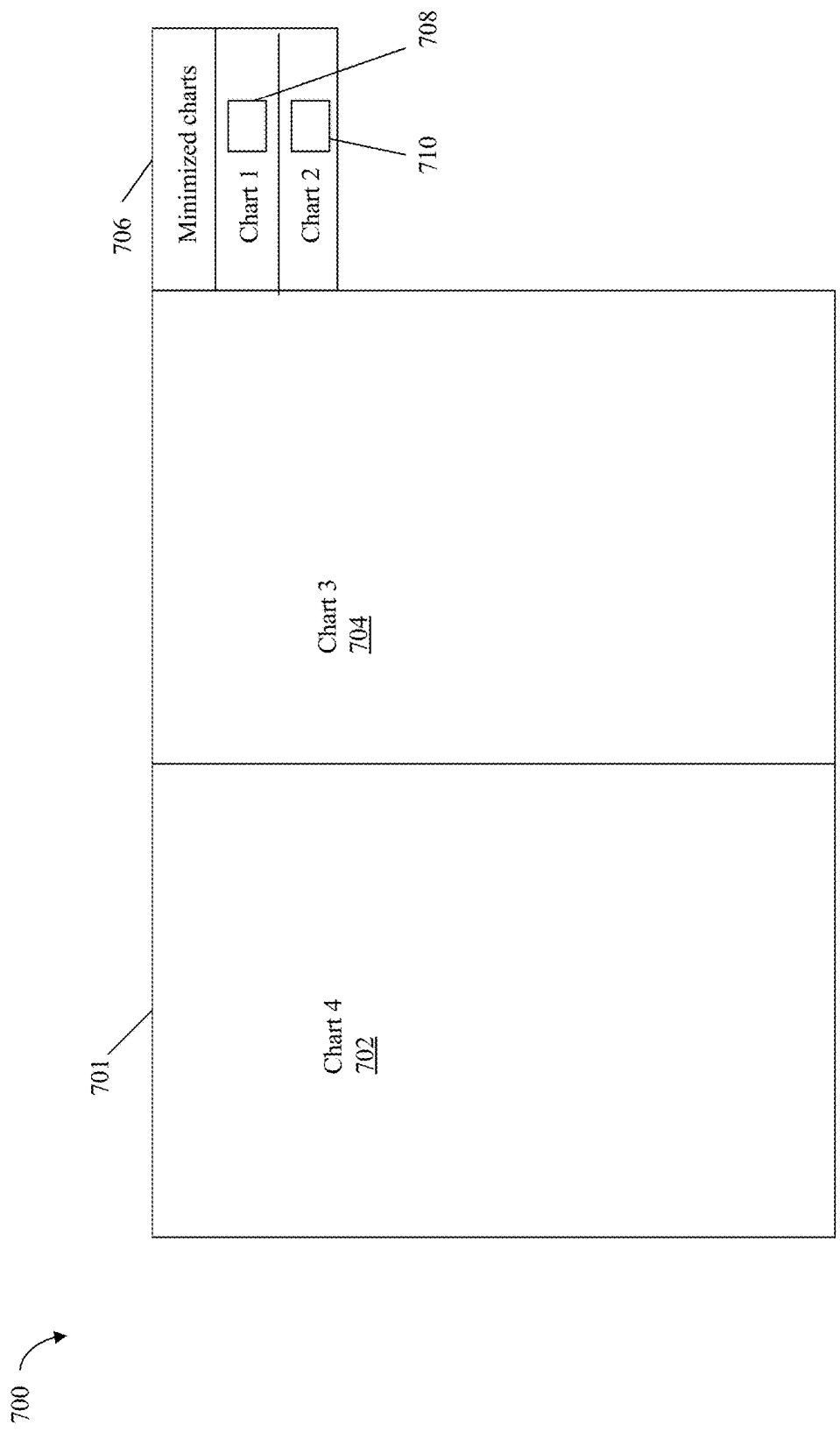

In the FIG. 9A, responsive to additionally minimizing the chart 2 652 of the FIG. 8B, processing may be performed to revise the layout and arrangement of the charts in the layout. In the example 700, the minimized chart 2 652 may be represented by an additional entry in the minimized charts area 706. Element 710 may denote a UI element that, when selected, restores the chart 2, where chart 2 is again included in the layout area and arrangement 701. As can be seen from the example 700, the minimized chart 2 is removed from the layout 701. Element 708 may denote a UI element that, when selected, restores the chart 1, where chart 1 is again included in the layout area and arrangement 701. As can be seen from the example 700, the minimized chart 1 remains removed from the layout 701.

Additionally, in the particular arrangement of the charts in the layout 701, it should be noted that the number of unminimized charts is 2, which is equal to the number of columns of the layout. In this case, processing may be performed to include one unminimized chart in each of the 2 columns. In the example 700, chart 4 702 is included in the left-most column of the layout and chart 3 704 is included in the right-most column of the layout. Each of the charts 702 and 704 may be automatically sized and expanded to fit into a full column of the layout 701.

Figure 9B:
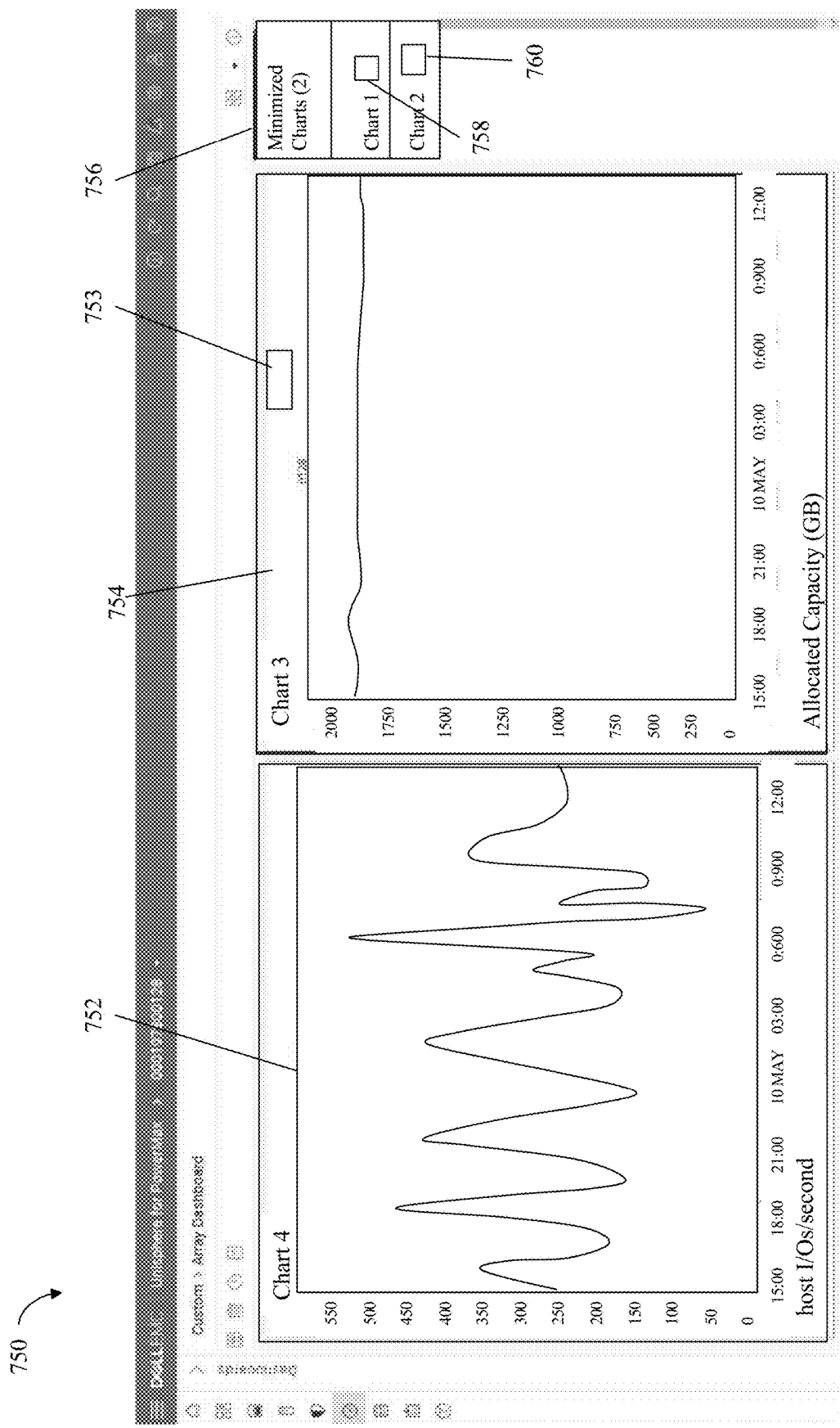

Referring to FIG. 9B, shown is a more detailed example 750 corresponding to the 2 minimized charts and the 2 non-minimized charts of the single chart component having the layout of FIG. 9A. The example 750 includes the 2 non-minimized charts 752 and 754 similar to the 2 non-minimized charts illustrated in layout area 701 of the FIG. 9A. Elements 758 and 760 of FIG. 9B correspond, respectively, to elements 708 and 710 of FIG. 9A.

At a fourth point in time subsequent to the third point in time, UI element 753 may be selected to minimize chart 3 754. Responsive to selecting UI element 753, the UI display 800 of FIG. 10A may be rendered.

Figure 10A:
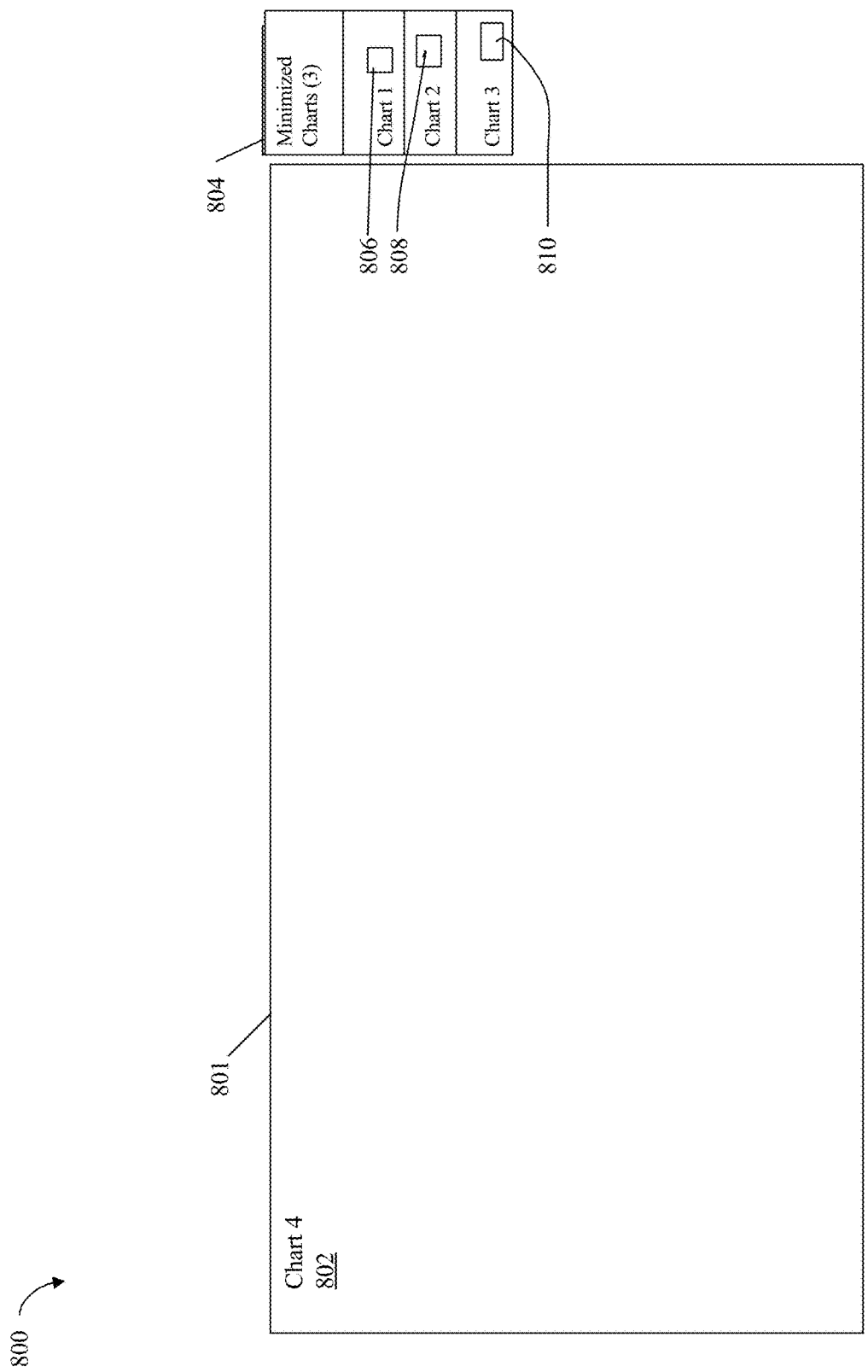

In the FIG. 10A, responsive to additionally minimizing the chart 3 754 of the FIG. 9B, processing may be performed to revise the layout and arrangement of the charts in the layout. In the example 800, the minimized chart 3 754 of FIG. 9B may be represented by an additional entry in the minimized charts area 804. Element 810 may denote a UI element that, when selected, restores the chart 3, where chart 3 is again included in the layout area and arrangement 801. As can be seen from the example 800, the minimized chart 3 is removed from the layout 801. Element 808 may denote a UI element that, when selected, restores the chart 2, where chart 2 is again included in the layout area and arrangement 801. Element 806 may denote a UI element that, when selected, restores the chart 1, where chart 1 is again included in the layout area and arrangement 801. As can be seen from the example 800, the minimized charts 1 and 2 also remain removed from the layout 801.

Additionally, in the particular arrangement of the charts in the layout 801, it should be noted that the number of unminimized charts is 1, which is now less than 2, the number of columns of the layout. In this case, processing may be performed to include the single one unminimized chart 802 in a single column. The chart 4 802 may be automatically sized and expanded to fit into the single column of the layout 801.

Figure 10B:
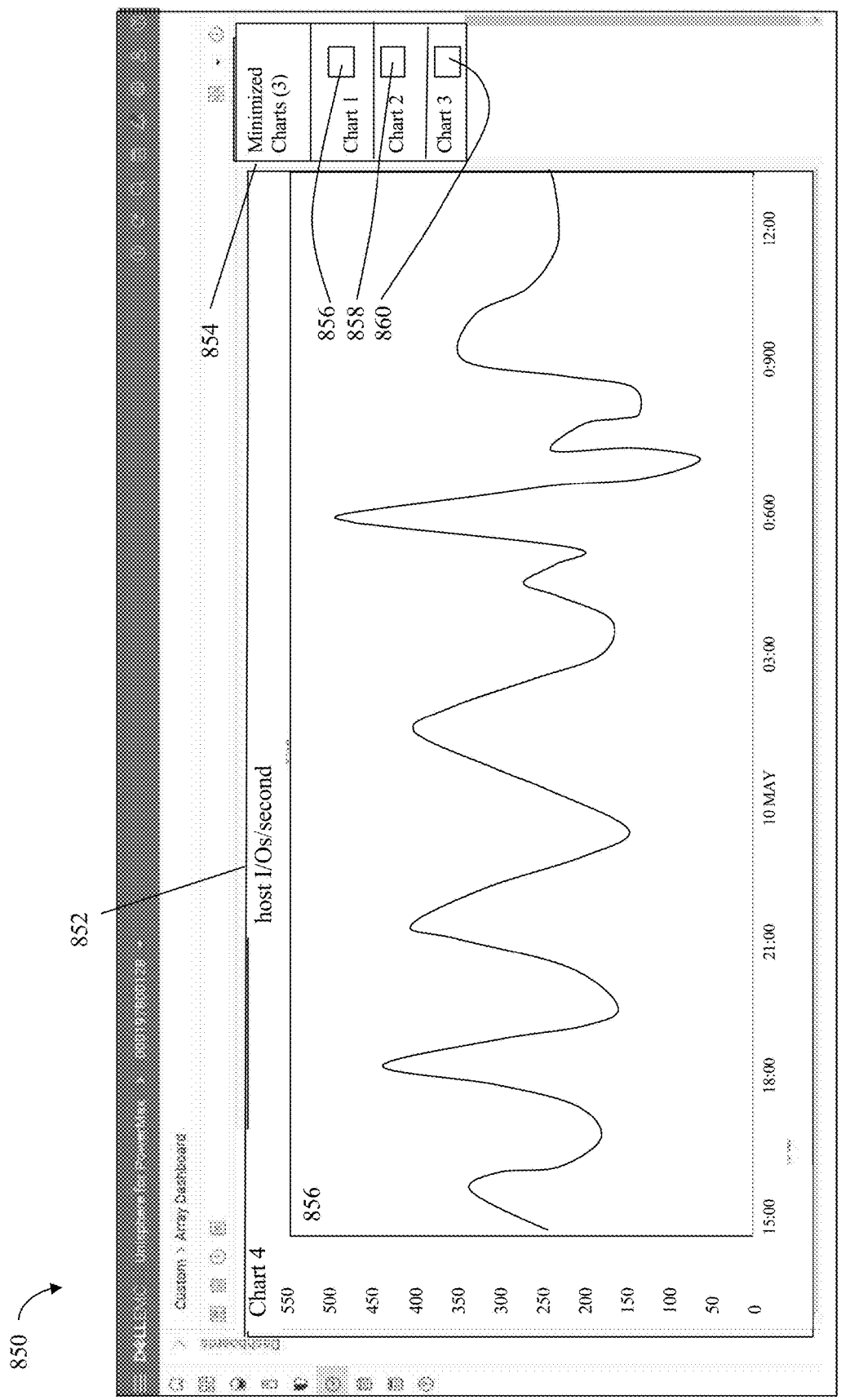

Referring to FIG. 10B, shown is a more detailed example 850 corresponding to the 3 minimized charts and the single non-minimized chart of the single chart component having the layout of FIG. 10A. The example 850 includes the 1 non-minimized chart 852 similar to the non-minimized chart 802 illustrated in layout area 801 of the FIG. 10A. Elements 854, 856, 858 and 860 of FIG. 10B correspond, respectively, to elements 804, 806, 808 and 810 of FIG. 10A.

In connection with the minimize feature as just described above in connection with minimizing one or more charts of a chart component, processing determines a revised layout of the existing non-minimized charts within the same component. The number of entries or cells in the layout and the locations for the unminimized charts in the entries or cells of the layout are determined based on the specified number of columns in the layout (e.g., the number of columns included in the component level metadata for the chart component). However, in at least one embodiment, the foregoing of preserving or maintaining the number of columns of the layout in a view may only be done when there are at least M unminimized charts for N columns, where M is equal to or greater than N. For example, if the number of columns is N=2, a layout for the view includes 2 columns so long as you have at least 2 unminimized charts. Once the user further minimizes one additional chart so that there is only 1 unminimized chart, the single chart is the only one in the component.

Figure 10C:
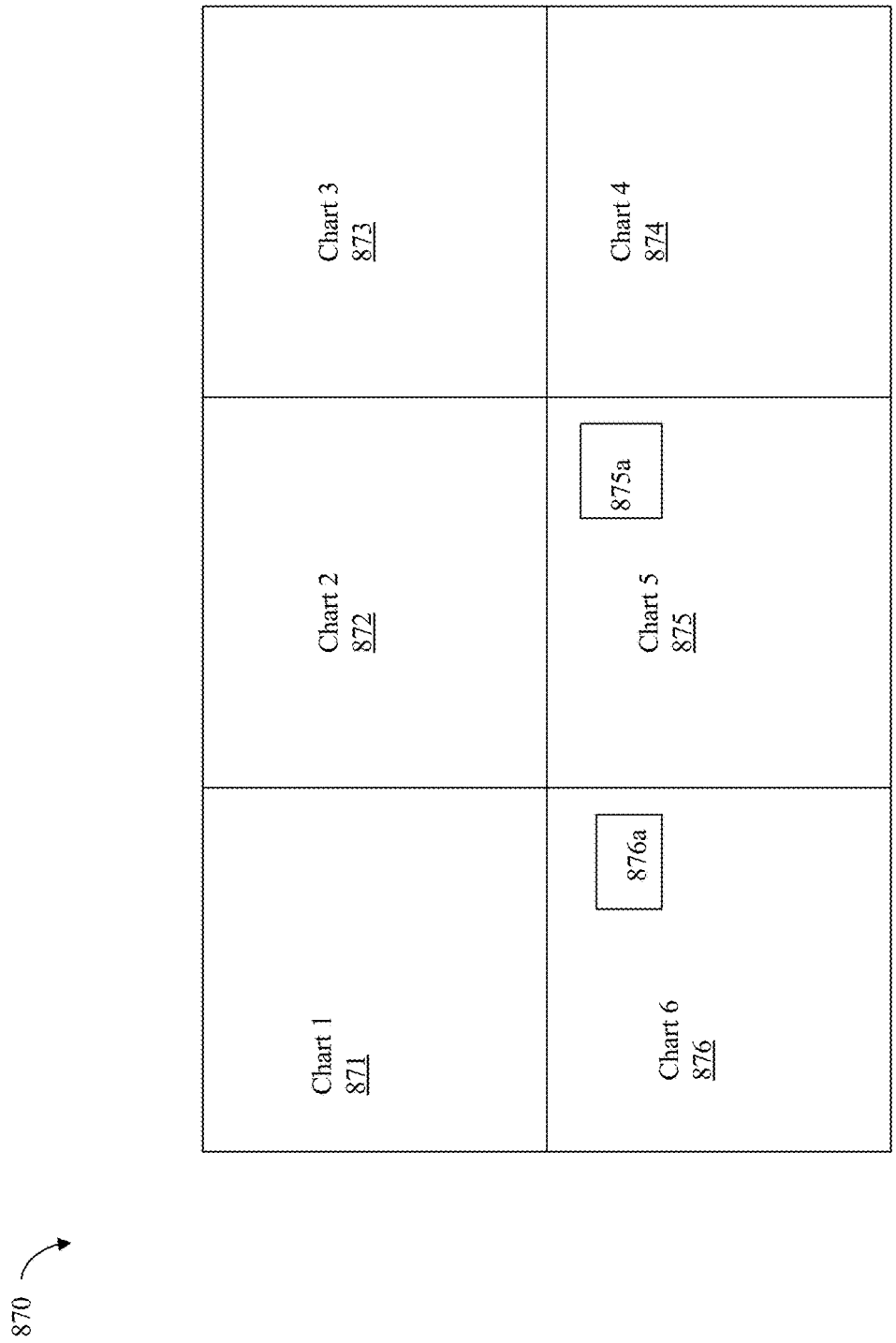

Now, with reference to FIG. 10C, consider a further example 870 illustrating a chart component with 3 columns and 6 charts 871, 872, 873, 874, 875, and 876. Let the example 870 illustrate the state of the rendered UI view at a fifth point in time. At a sixth point in time subsequent to the fifth point in time, a user may select UI element 876a which results in minimizing chart 6 876. The user also selects UI element 875a which results in minimizing chart 5 875.

Figure 10D:
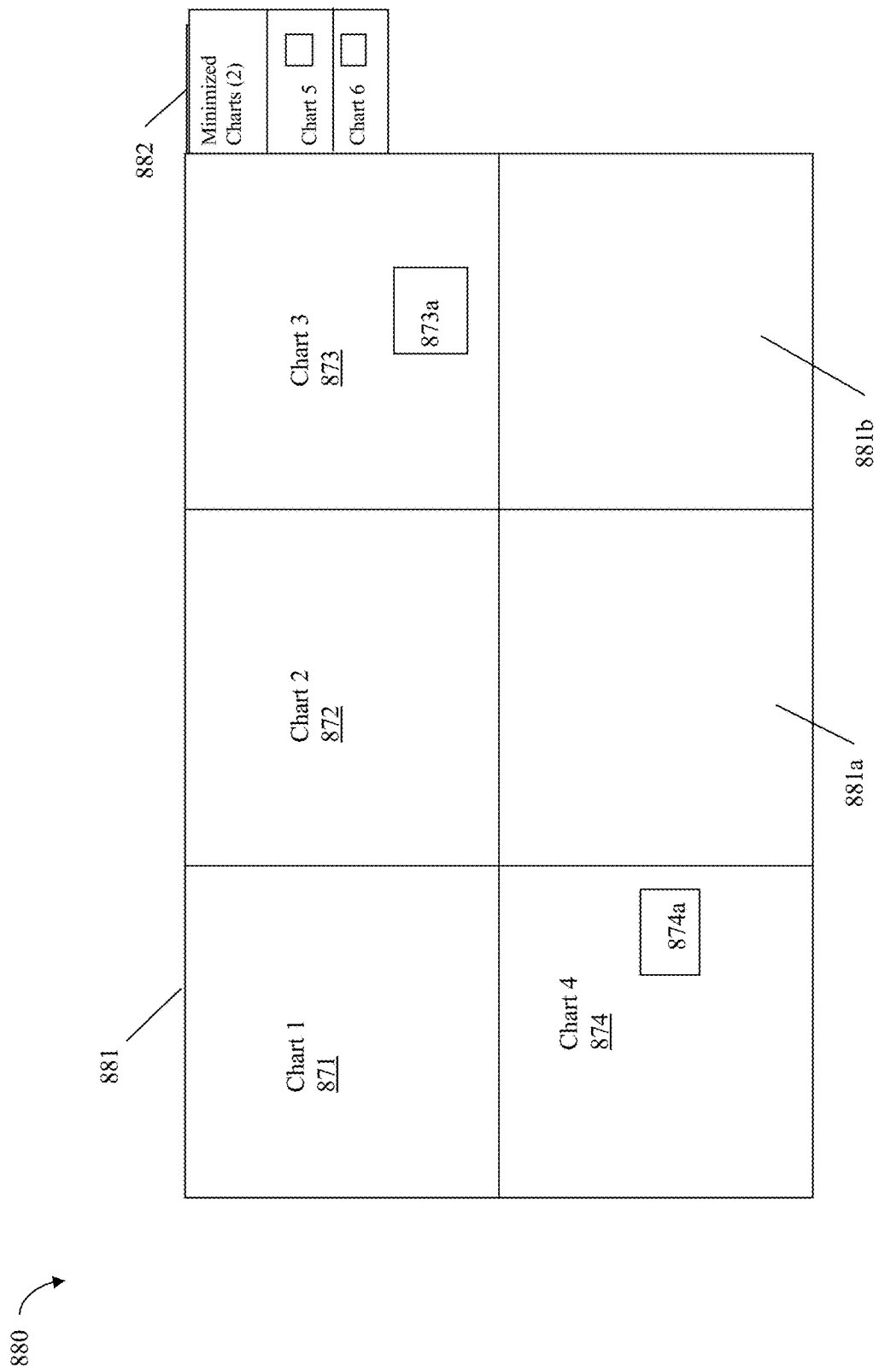

FIG. 10D shows the resulting layout 881 after minimizing charts 875 and 876 of FIG. 10C. In particular note that two of the entries 881a, 881b are now empty and that charts 5 and 6 have entries in the minimized chart area 882. Consistent with the discussion above, the number of columns N=3 and the number of unminimized charts=4 so the number of columns in the layout 881 of the view is maintained or preserved.

At a seventh point in time subsequent to the sixth point in time, a user may select UI element 874a which results in minimizing chart 4 874. The user also selects UI element 873a which results in minimizing chart 3 873.

Figure 10E:
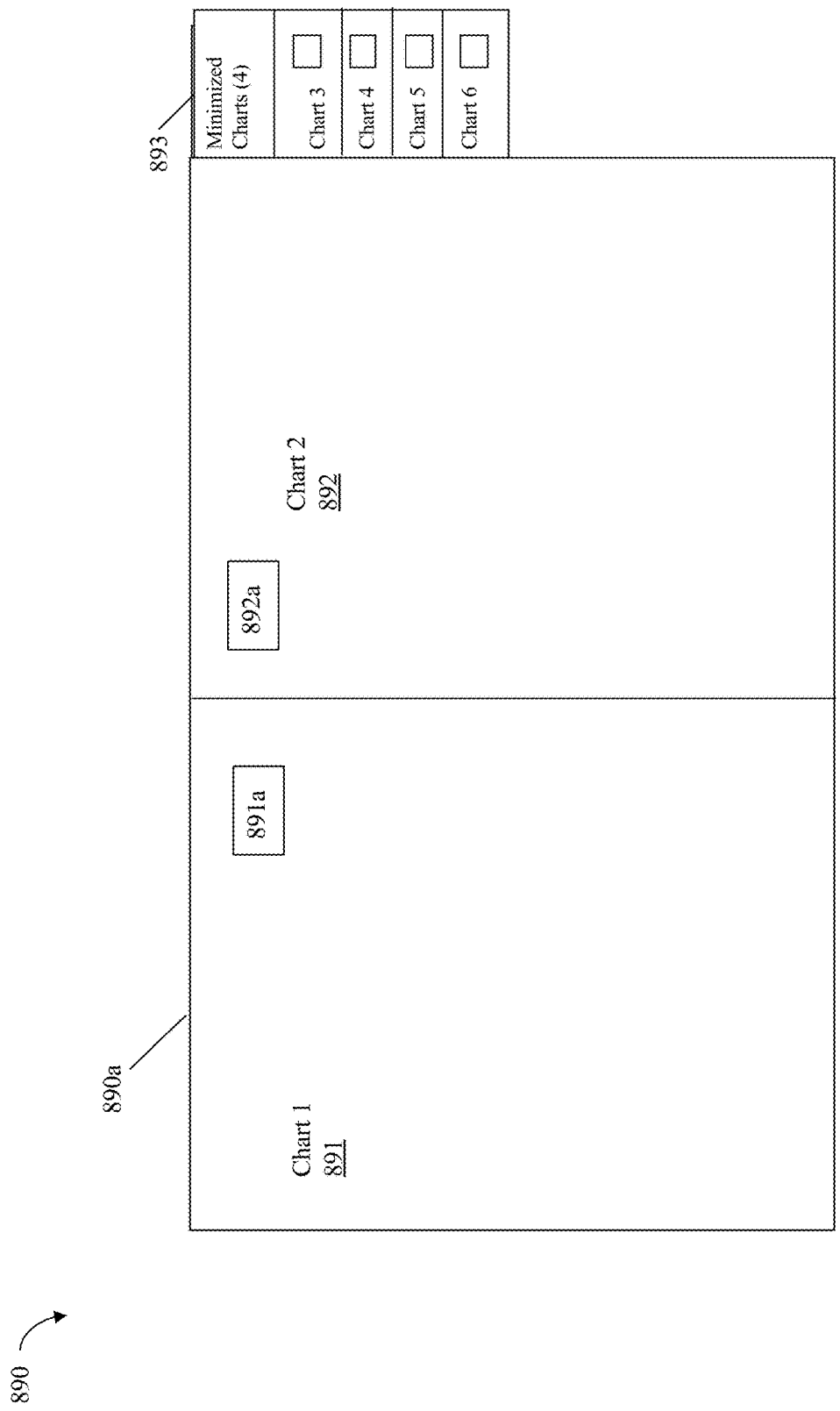

FIG. 10E shows the resulting layout 890a after minimizing charts 873 and 874 of FIG. 10D. In particular note that 2 additional entries for chart 3 873 and chart 4 874 are now included in the minimized chart area 893. After the seventh point in time, the chart component includes 4 minimized charts and 2 unminimized charts. Consistent with the discussion above, the number of columns N=3 and the number of unminimized charts=2 so the number of columns in the layout 890a is not maintained or preserved as 3 (e.g., number of unminimized charts<the number of columns N specified as the component metadata data). In this case, the actual number of columns used for the layout 891 in the rendered view is equal to 2, the number of unminimized charts of the component. Each of the unminimized charts 891 and 892 has a size customized to fit into as the sole entry in a single column of the layout 890a.

Also mentioned herein is a maximize feature or operation that may be performed with respect to a chart included in a chart component. In at least one embodiment, UI controls may provide selectable options to maximize any chart of a chart component. For example, UI element 891a may be selected to maximize chart 1 891, and UI element 892a may be selected to maximize chart 2 892. In response to selecting a UI element to maximize a particular one of the charts, the selected particular chart may be expanded to completely fill the layout area 890a. For example, assume at an eighth point in time subsequent to the seventh point in time, UI element 892a is selected to maximized chart 2 892.

Figure 10F:
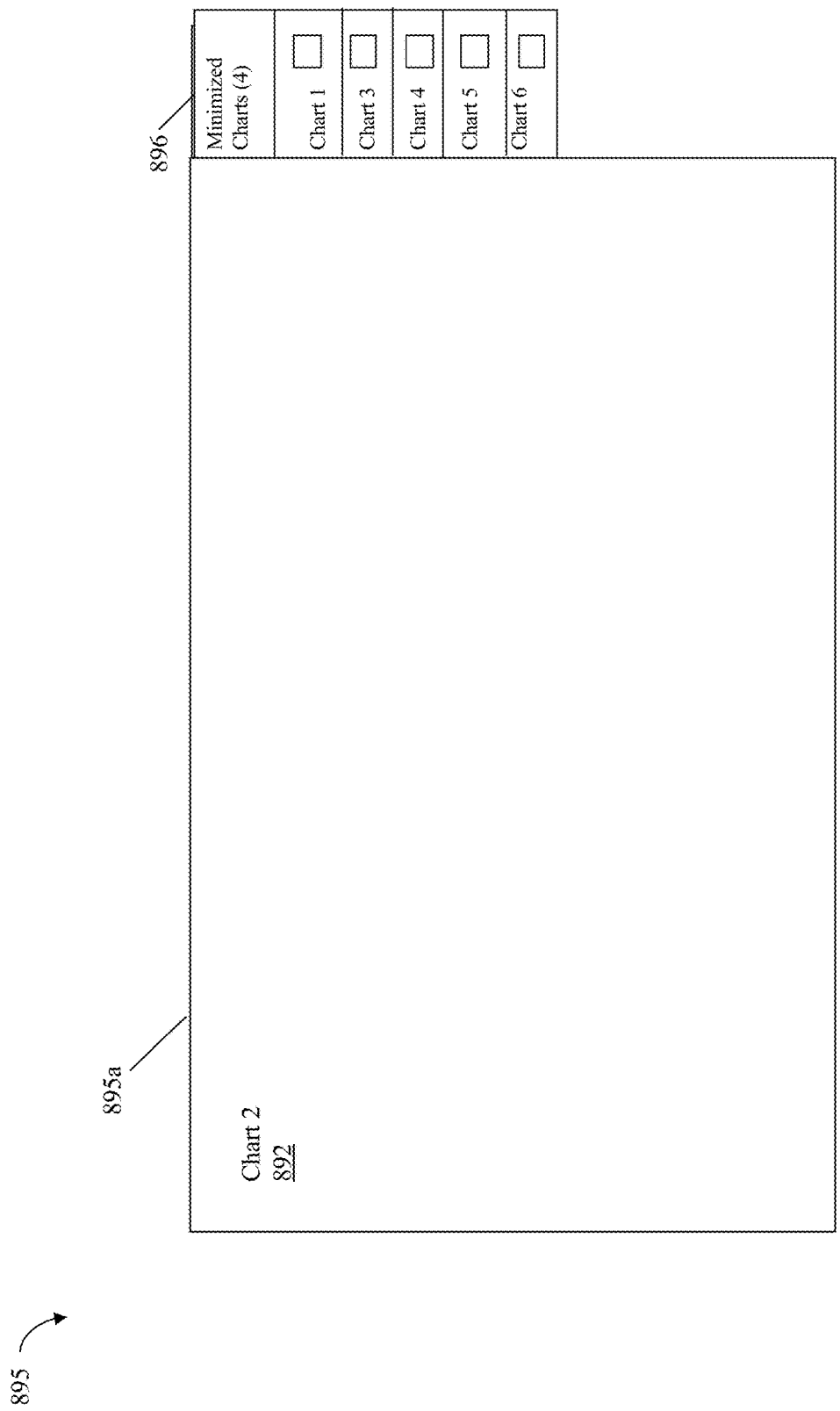

Referring to FIG. 10F, shown is the resulting UI display subsequent to selecting 892a whereby chart 2 892 is maximized. When any single chart is maximized, all other charts of the component may be automatically minimized and added to the minimized chart area 896. The single maximized chart, such as the chart 2 892, may then be rendered as the single chart in the layout area 895a.

What will now be described in more detail is the feature of chart synchronization that may be included in an embodiment in accordance with the techniques herein. In at least one embodiment, the synchronization feature may be used with a chart component including multiple charts. The synchronized attribute of the chart component level metadata may indicate whether charts of the chart component are currently synchronized or unsynchronized.

When synchronization is enabled for a particular chart component in at least one embodiment, all charts of that particular component are characterized as synchronized based on the location of the mouse or cursor in any one of the charts in that component. Synchronization generally applies to information that is visually displayed in multiple charts of the same component at the same point in time when there is a mouse over, selection, or other user interaction or UI event at a particular point within one of the charts in the component.

Figure 11:
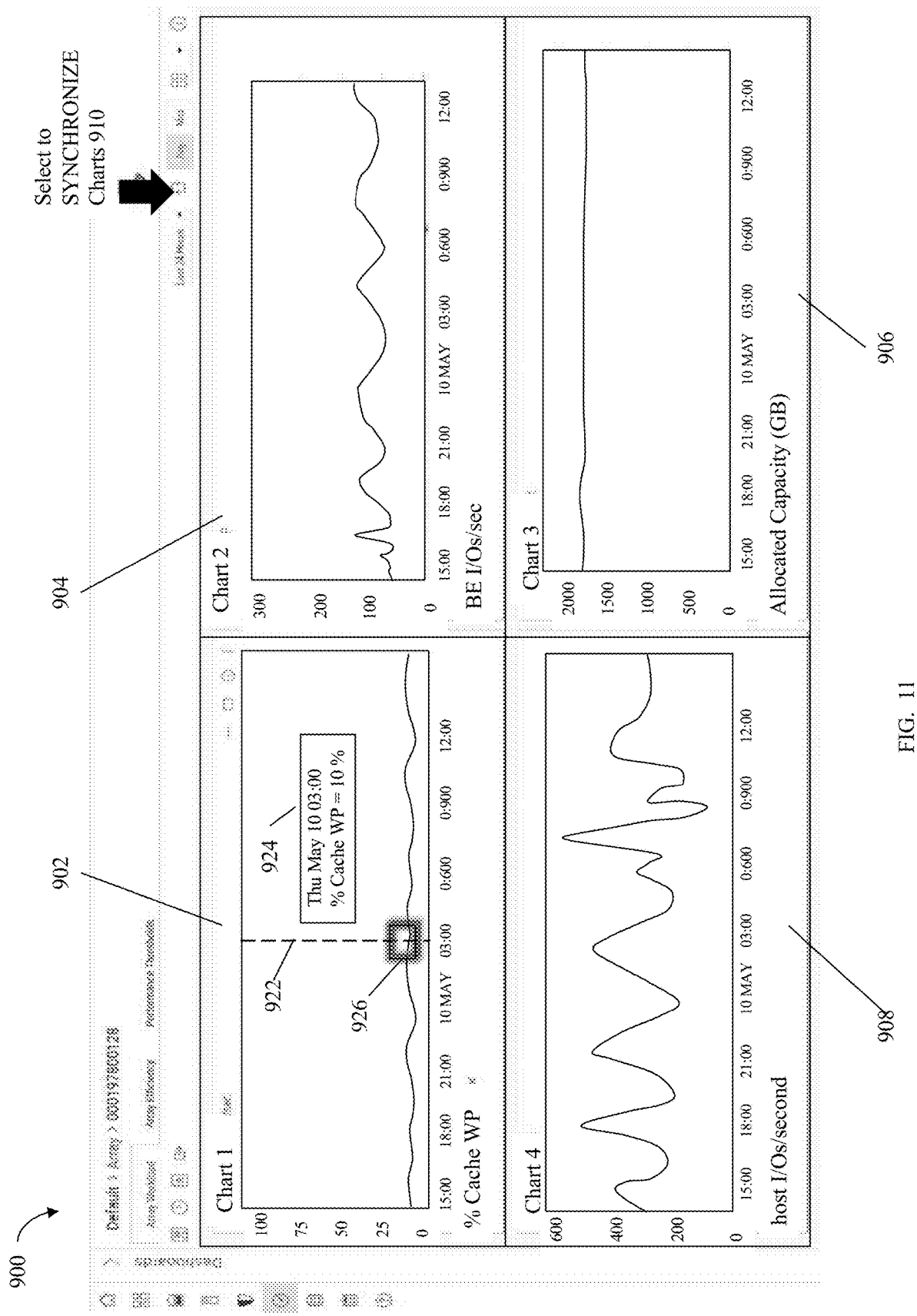
FIGS. 11, 12, 13A and 13B illustrate examples of synchronization performed among charts of the same component in an embodiment in accordance with the techniques herein.

Reference is made to FIG. 11 at a ninth point in time where the UI view 900 may be rendered. In the example 900, there are 4 charts 902, 904, 906, 908 and 910 of a single chart component rendered using the techniques described herein. Currently, the 4 charts of the example 900 may be unsynchronized. When unsynchronized, a user may position a cursor or mouse over a location in the chart 1 902 of the rendered UI view. A user may, for example, move the mouse or cursor within the chart 902 to a location 926 corresponding to a particular point in time, such as 3:00 am on May 10, on the X axis as denoted by a vertical line 922. In response to positioning the mouse or cursor to location 926, a visual indicator, such as the small rectangular box, may be displayed at the location. Additionally, a vertical line 922 may be drawn to denote the X axis coordinate of the location 926. Yet further, an informational box 924 may be displayed which provides a text description related to the location 926. In this example, the box 924 may include a text description for the current value of the X coordinate for the location 926, and current metric value for the location 926. For example, the box 924 indicates that the current cursor or mouse over location in the chart 902 denotes the metric value of 10% for the metric, "% Cache WP" at 3:00 am on Thursday May 10. The metric "% Cache WP" may indicate the current percentage of the system cache used to stored WP data at the identified point in time, 3:00 am on Thursday May 10. As the mouse or cursor is repositioned within the chart 902 to a new location, elements 922, 924 and 926 may be accordingly updated to correspond to the new location.

In the example 900, since the charts are currently unsynchronized, the movements of the cursor or mouse within the chart 902 only affects chart 902.

At a tenth point in time subsequent to the ninth point in time, a user may select UI element 910 to synchronize the 4 charts of FIG. 11. Responsive to selecting UI element 910, processing is performed to synchronize the charts, such as by accordingly modifying the synchronization attribute of the chart component metadata. Additionally, the charts 904, 906 and 908 are coordinated or synchronized to have the same mouse or cursor position 926 of the chart 902 emulated within each of the charts 904, 906 and 908.

Figure 12:
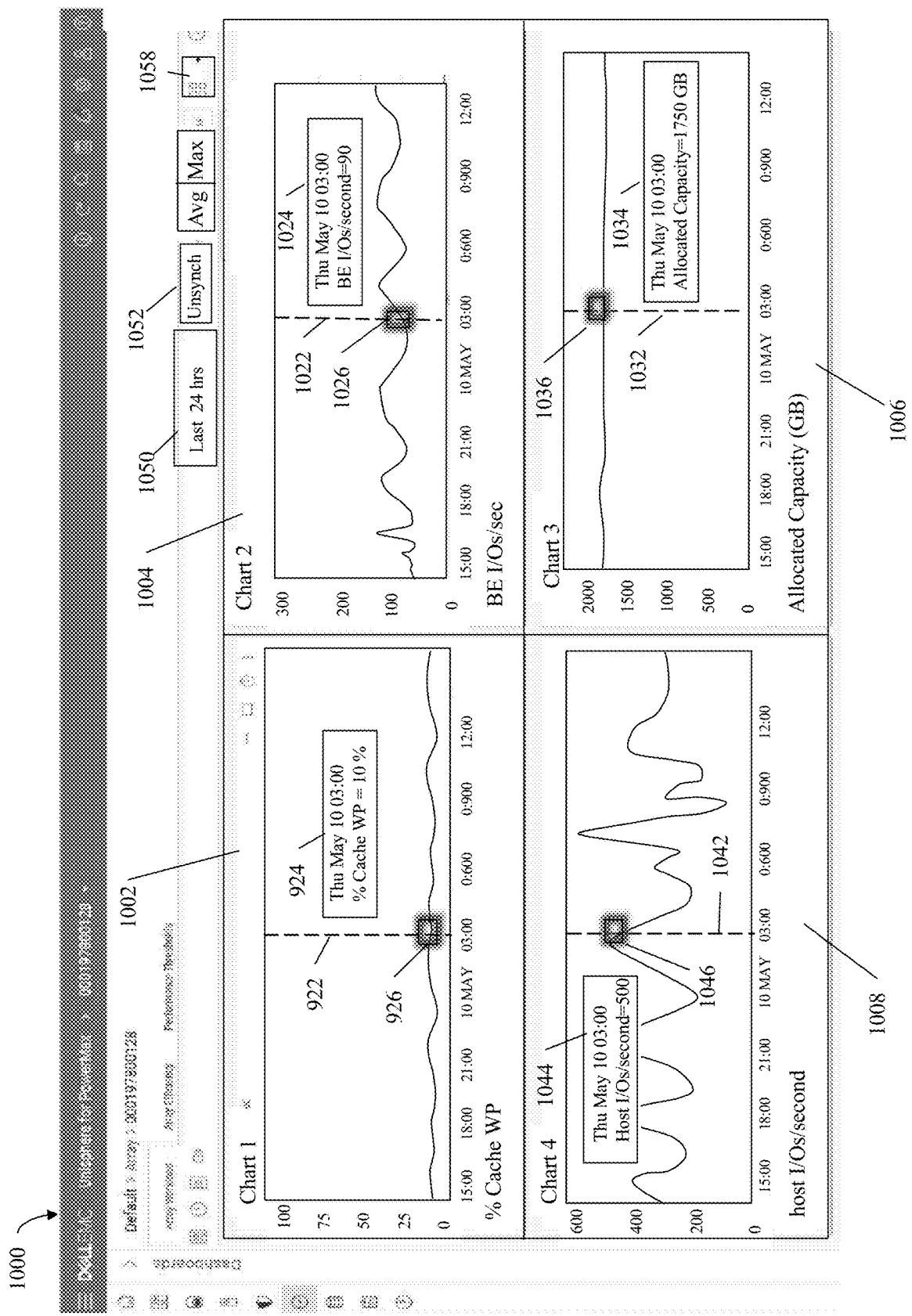

To further illustrate, reference is made to FIG. 12. Responsive to selecting UI element 910 of FIG. 11 when the cursor or mouse is currently located as position 926 in the chart 1 902, the UI view may be updated to the view 1000 of the FIG. 12. Responsive to the mouse or cursor positioned at location 926 within the chart 1002, all other charts 1004, 1006 and 1008 are coordinated or synchronized to have the same mouse or cursor position emulated within the charts 1004, 1006 and 1008. In this example, the particular point in time on the X axis denoted by the vertical line 922 on the chart 902 denotes the current X axis coordinate for the location of the mouse or cursor within the chart 902. All other charts 1004, 1006 and 1008 are also synchronized to have the same mouse or current position emulated at the same current time, May 10 at 3 a.m., as denoted by the line 922.

The chart 2 1004 is updated to have a vertical line 1022 corresponding to the same current time as denoted by 922. The chart 1004 is also updated to have a highlighted box 1026 corresponding to the particular metric value of the chart 1004 at the current time of May 10 at 3 a.m. The chart 1004 is also updated to have a text box 1024 describing the particular metric value of the chart 1004 at the current time of May 10 at 3 a.m. The chart 1004 is a graphical display of the performance metric backend (BE) I/Os per second. The text box 1024 indicates that the current value for this performance metric is 90 I/Os per second on Thursday May 10 at 3 a.m.

The chart 3 1006 is updated to have a vertical line 1036 corresponding to the same current time as denoted by 922. The chart 1006 is also updated to have a highlighted box 1036 corresponding to the particular metric value of the chart 1006 at the current time of May 10 at 3 a.m. The chart 1006 is also updated to have a text box 1034 describing the particular metric value of the chart 1006 at the current time of May 10 at 3 a.m. The chart 1006 is a graphical display of metric allocated storage capacity in GBs with respect to all allocated storage of the data storage system. The text box 1034 indicates that the current value for this metric is 1750 GBs on Thursday May 10 at 3 a.m.

The chart 4 1008 is updated to have a vertical line 1042 corresponding to the same current time as denoted by 922. The chart 1008 is also updated to have a highlighted box 1046 corresponding to the particular metric value of the chart 1008 at the current time of May 10 at 3 a.m. The chart 1008 is also updated to have a text box 1044 describing the particular metric value of the chart 1008 at the current time of May 10 at 3 a.m. The chart 1008 is a graphical display of the performance metric host I/Os per second. The text box 1044 indicates that the current value for this performance metric is 500 host I/Os per second on Thursday May 10 at 3 a.m.

Subsequently repositioning the cursor or mouse within the chart 1002 causes elements 922, 924 and 926 to be updated and additionally causes the elements 1022, 1024, 1026 of the chart 1004, the elements 1032, 1034 and 1036, and the elements 10342, 1044 and 1046 to be synchronized and updated based on the repositioning.

In the FIG. 12, it should be noted that UI element 1050 may denote a UI control to modify the time frame or time window for the component. In at least one embodiment, selection of UI element 1050 may result in display of a menu of predefined time frames from which a user may select. Currently, the time frame is set as the last 24 hours. In response to selecting a menu item with the UI element 1050, processing may be performed such as illustrated in the FIG. 5.

The UI element 1052 may be selected to modify the synchronization attribute for the chart component having the charts 1002, 1004, 1006 and 1008 from synchronized to unsynchronized. Selection of the UI element 1052 while the cursor or mouse is positioned at the location 926 within the chart 1002 results in the UI view being updated to that as illustrated in FIG. 11. Selection of UI element 1052 results in processing performed similar to that as described in connection with the FIG. 6 with the difference that the component synchronization attribute is updated rather than the number of columns of the layout, and the re-rendering 488 is due to the change in the synchronization attribute rather than the change in the number of columns of the layout.

The UI element 1058 may be selected to modify or change the number of columns in the layout for the chart component having the charts 1002, 1004, 1006 and 1008. Selection of UI element 1058 results in processing performed as described in connection with the FIG. 6 to change the number of columns of the layout.

The foregoing example with respect to synchronization illustrated in FIG. 12 is synchronization of a mouse over or cursor positioning within a single chart 1002. More generally, such synchronization of charts of a component may be performed with respect to any specified user interaction or UI event within a single one of the charts. For example, if the user clicked, such as using a mouse, on a particular location on a first of the charts, the point in time corresponding to the particular location may be identified and relevant information corresponding to the point in time may be displayed to the user within the first chart and the other synchronized charts.

As yet another example, another type of user interaction or UI event that may be synchronized with respect to the charts of the same component is a zoom feature or action that will now be described with reference to FIG. 13A.

Figure 13A:
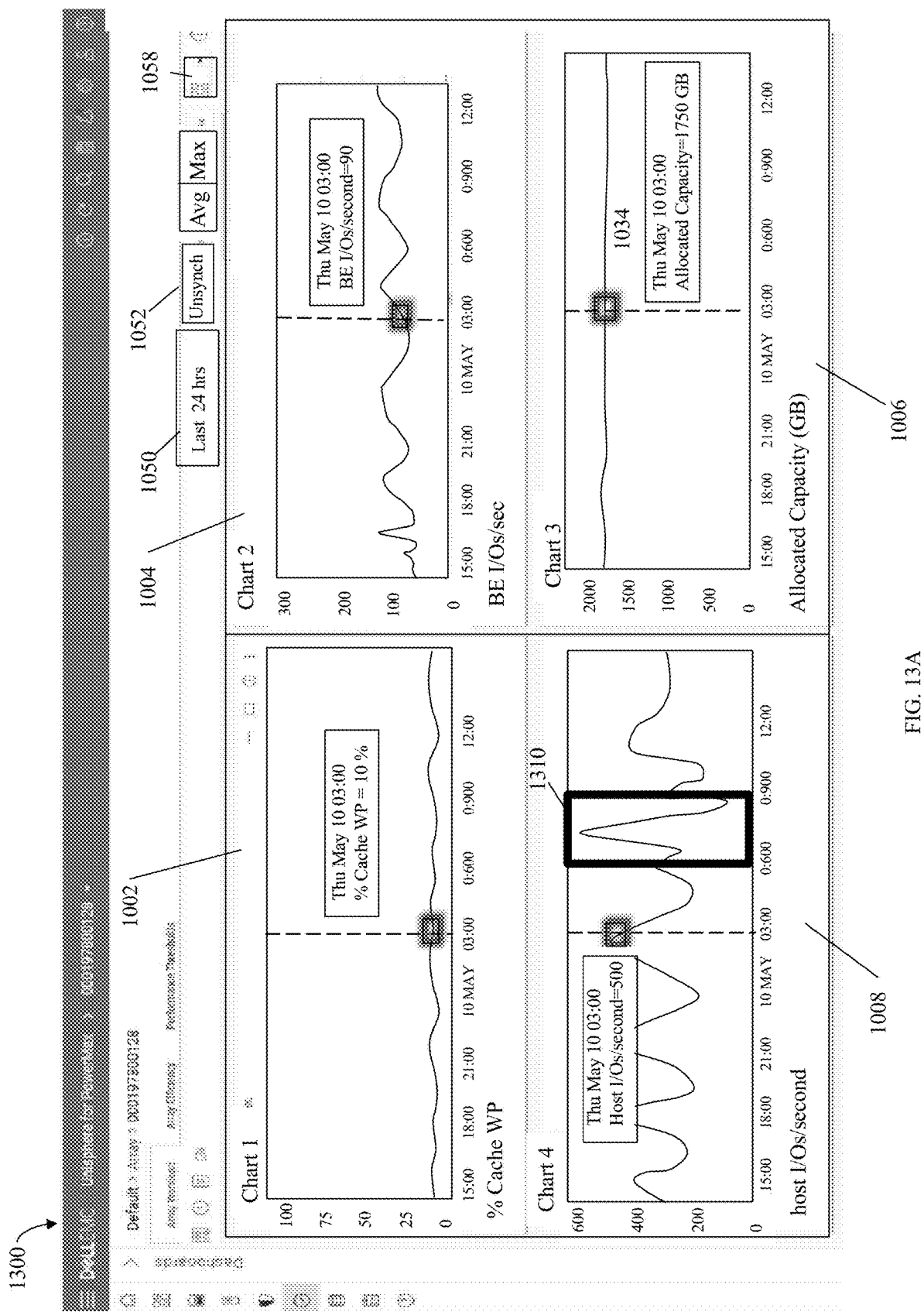

The FIG. 13A shows the same information rendered as in the FIG. 12 with one item of additional information denoted by element 1310. The element 1310 may denote a selection of a portion of the chart 4 1008 made by a user interaction with the rendered chart 1004. For example, a selection of the area 1310 may be made using a mouse. Selecting the portion 1310 may trigger processing to provide an expanded or zoomed view of the area 1310 rendered in the chart 1008. In this example, since the charts 1002, 1004, 1006 and 1008 are all synchronized, the zooming action may synchronized across all the charts 1002, 1004, 1006 and 1008 of the component. In particular, the zoom action of the chart 1004 to zoom in on the portion 1310 is further emulated in the charts 1002, 1006 and 1008. In particular, the portion 1310 denotes a time span from 6-9 am on May $10^{th}$ whereby the user is requesting to render in the component 1008 an expanded view of the portion 1310 so that the time span 6-9 a.m. of May $10^{th}$ extends the entire X axis range (e.g., 6 a.m. is the smallest or first time value on the X axis and 9 a.m. is the largest or last time values on the X axis). In this manner, the zooming action results in selective expanded viewing the metric host I/Os per second in the chart 1008 for the time range between 6-9 a.m. on May $10^{th}$ as denoted by 1008 of the FIG. 13B.

Figure 13B:
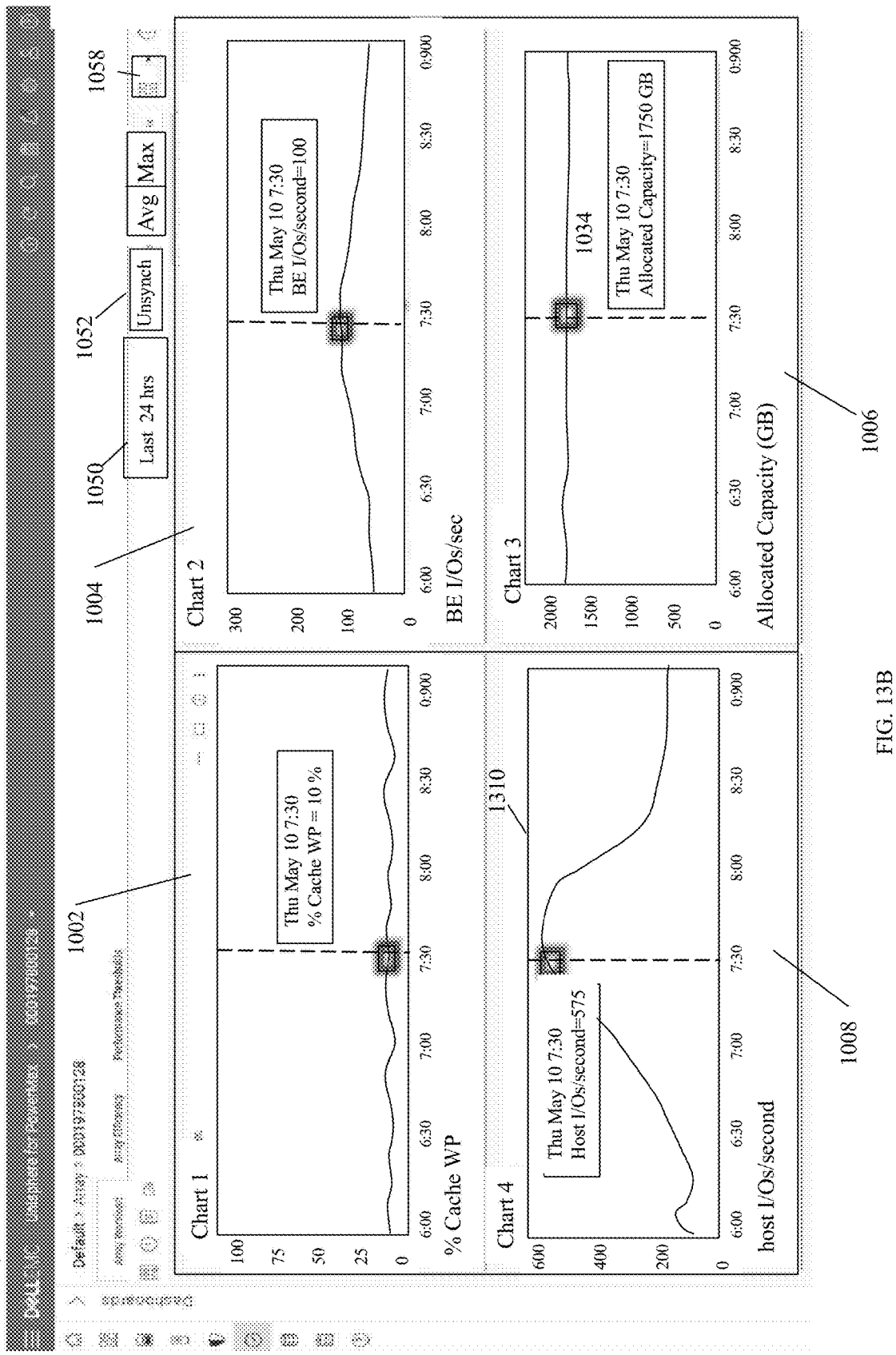

Due to the synchronization, the same zooming action for the same portion 1310 is performed with respect to each of the other charts 1002, 1004 and 1006 for the time range between 6-9 a.m. on May $10^{th}$ as denoted by 1002, 1004 and 1006 of the FIG. 13B. Thus, the FIG. 13B illustrates the UI rendered as a result of performing the zoom action of FIG. 13A when synchronization is enabled for the component including the charts 1002, 1004, 1006 and 1008. Zooming with synchronization enabled for a chart component results in processing performed similar to that as described in connection with the FIG. 6 with the difference that the re-rendering 488 renders the synchronized revised UI views for the charts of the component to reflect the zoomed view.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of rendering a user interface (UI) comprising:
issuing a first call from UI code of a data storage system management application to a library in accordance with an application programming interface (API) to render a first dashboard component of the UI, wherein the first call includes a first plurality of input parameters that specify first metadata for the first dashboard component and that specify first request parameters used to obtain information from a server to populate the first dashboard component with data, wherein the first plurality of input parameters includes a first parameter providing an initial synchronization setting of whether a plurality of charts of the first dashboard component are synchronized or unsynchronized, wherein the initial synchronization setting provides an initial value for a synchronization attribute for the first dashboard component, wherein the synchronization attribute indicates whether the plurality of charts of the first dashboard component are synchronized at a particular point time, wherein the UI includes selectable UI controls to further modify the synchronization attribute between synchronized and unsynchronized at various points in time as desired during execution of the data storage management application, wherein when the synchronization attribute is set to synchronized, an interaction or event in one of the plurality of charts of the first dashboard component is emulated in each other chart of the plurality of charts of the first dashboard component, wherein when the synchronization attribute is set to unsynchronized, an interaction or event in one of the charts of the plurality of charts of the first dashboard component is not emulated in any other chart of the plurality of charts of the first dashboard component, wherein the library includes code that populates and renders UI dashboard components including the first dashboard component, and wherein the UI dashboard components populated and rendered by the library include tables and charts;
responsive to the first call, issuing a first set of one or more requests, from the library to the server in accordance with the first request parameters, to obtain first information used to populate the first dashboard component;
receiving, by the library from the server, the first information;
rendering, by the library, the first component in the UI, wherein said rendering includes populating the first dashboard component with the first information; and
performing first processing by code of the library that automatically polls the server periodically at each occurrence of a defined polling time interval to obtain a current version of the first information and accordingly re-renders the first dashboard component of the UI with the current version of the first information, wherein the first plurality of input parameters of the first call issued from the UI code to the library includes at least one parameter identifying the defined polling time interval, and wherein at least one parameter of the first plurality of parameters of the first call issued from the UI code to the library specifies associated chart metadata for a chart of the plurality of charts of the first dashboard component, wherein the associated chart metadata includes a first chart type identifying a particular chart type for the chart, and wherein the first chart type is one of a predefined set of chart types including a bar chart, a line chart, and a graph.

2. The method of claim 1, wherein the UI dashboard components rendered in the UI include a second dashboard component that includes a table and wherein the first plurality of input parameters specifies component level metadata for the table, table-specific level metadata for the table, and table request information identifying the first request parameters used to obtain the first information from the server to populate the table.

3. The method of claim 1, wherein each of the plurality of charts is a graphical display of data in the UI.

4. The method of claim 3, wherein the first plurality of parameters includes an array with an entry for each chart of the plurality of charts, wherein the entry of the array for said each chart is a structure including chart metadata for said each chart and including chart request information for said each chart.

5. The method of claim 4, wherein the chart request information includes a portion of the first request parameters used to obtain a corresponding portion of the first information from the server to populate said each chart.

6. The method of claim 4, wherein the chart metadata for said each chart includes information identifying one chart type of the predefined set of chart types.

7. The method of claim 3, wherein the first request parameters include a time frame identifying a time range denoting an amount of time for which the first information is requested from the server in the first set of one or more requests for the plurality of charts.

8. The method of claim 7, wherein the time frame is included in second metadata associated with the first dashboard component and denotes the time range denoting the amount of time for which requests are issued to the server to obtain information used to populate the plurality of charts of the first dashboard component.

9. The method of claim 8, further comprising:
receiving, by the library, a second call to update the time frame associated with the first dashboard component, wherein the second call includes a parameter identifying a revised time frame; and
responsive to receiving the second call, updating the second metadata of the first dashboard component to include the revised time frame wherein the revised time frame replaces the time frame.

10. The method of claim 9, wherein, prior to the second call, the first set of one or more requests requested the first information based on the time frame, and wherein, subsequent to the second call, the method further comprises:
issuing a second set of one or more requests from the library to the server to obtain a current version of the first information, wherein the second set of one or more requests request information based on the revised time frame; and
updating the first component of the UI by populating the first dashboard component with the current version of the first information.

11. The method of claim 10, wherein the plurality of charts are rendered on the UI in accordance with layout information included in the second metadata associated with the first dashboard component, wherein the layout information includes a number of columns, and wherein the method further comprises:
rendering the plurality of charts on the UI in a layout having the number of columns;
selecting a user interface element to minimize a first of the plurality of charts; and
responsive to selecting the user interface element, performing first processing including:
minimizing the first chart;
determining, in accordance with the layout information, a revised layout for the plurality of charts without the first chart; and
rendering the plurality of charts without the first chart in accordance with the revised layout.

12. The method of claim 11, wherein the plurality of charts includes a number of charts, N and, at a point in time, a first number of the N charts are minimized, and a remaining number, R, of the N charts are not minimized, and wherein the method includes:
determining whether R is less than the number of columns, M; and
responsive to determining R is less than M, determining the revised layout, that when displayed, renders the R charts in R columns in the first dashboard component.

13. The method of claim 3, wherein the plurality of charts are rendered on the UI, and wherein the method further comprises:
selecting a user interface element to synchronize the plurality of charts;
responsive to selecting the user interface element, setting the synchronization attribute to synchronize the plurality of charts responsive to a user interaction in a first of the plurality of charts, wherein a remaining chart set includes the plurality of charts without the first chart;
identifying, via the user interaction with the UI, a location in the first chart; and
responsive to said identifying, performing first processing including:
displaying first data corresponding to the location in the first chart on the UI; and
synchronizing each chart of the remaining chart set to display information about the location relative to said each chart of the remaining chart set.

14. The method of claim 13, wherein the plurality of charts are graphical displays each including an axis denoting time, wherein the location in the first chart identifies a first point in time at which a first metric has a first value and the first data identifies the first point in time, the first metric and the first value, and wherein said synchronizing each chart of the remaining chart set to display information about the location relative to said each chart of the remaining chart set further comprises:
displaying second data in said each chart, the second data including a current value of a particular metric of said each chart at the first point in time.

15. The method of claim 13, wherein the user interaction includes any of: positioning a cursor at the location within the first chart, and performing a selection identifying the location within the first chart.

16. The method of claim 13, wherein each of the plurality of charts of the first dashboard are synchronized and rendered in a corresponding portion of the first dashboard component, wherein the first chart is displayed in a first corresponding portion of the first dashboard component, and the method further comprising:
identifying, in connection with a zoom feature of the UI, a particular portion of the first chart rendered in the UI;
rendering, in the first corresponding portion of the first dashboard component, an enlarged view of the particular portion of the first chart; and synchronizing each chart of the remaining chart set to also render an enlarged view of the particular portion relative to said each chart of the remaining chart set.

17. A system comprising:

a processor; and a memory comprising code stored therein that, when executed, performs a method of rendering a user interface (UI) comprising:

issuing a first call from UI code of a data storage system management application to a library in accordance with an application programming interface (API) to render a first dashboard component of the UI, wherein the first call includes a first plurality of input parameters that specify first metadata for the first dashboard component and that specify first request parameters used to obtain information from a server to populate the first dashboard component with data, wherein the first plurality of input parameters includes a first parameter providing an initial synchronization setting of whether a plurality of charts of the first dashboard component are synchronized or unsynchronized, wherein the initial synchronization setting provides an initial value for a synchronization attribute for the first dashboard component, wherein the synchronization attribute indicates whether the plurality of charts of the first dashboard component are synchronized at a particular point time, wherein the UI includes selectable UI controls to further modify the synchronization attribute between synchronized and unsynchronized at various points in time as desired during execution of the data storage management application, wherein when the synchronization attribute is set to synchronized, an interaction or event in one of the plurality of charts of the first dashboard component is emulated in each other chart of the plurality of charts of the first dashboard component, wherein when the synchronization attribute is set to unsynchronized, an interaction or event in one of the charts of the plurality of charts of the first dashboard component is not emulated in any other chart of the plurality of charts of the first dashboard component, wherein the library includes code that populates and renders UI dashboard components including the first dashboard component, and wherein the UI dashboard components populated and rendered by the library include tables and charts;

responsive to the first call, issuing a first set of one or more requests, from the library to the server in accordance with the first request parameters, to obtain first information used to populate the first dashboard component;

receiving, by the library from the server, the first information;

rendering, by the library, the first component in the UI, wherein said rendering includes populating the first dashboard component with the first information; and performing first processing by code of the library that automatically polls the server periodically at each occurrence of a defined polling time interval to obtain a current version of the first information and accordingly re-renders the first dashboard component of the UI with the current version of the first information, wherein the first plurality of input parameters of the first call issued from the UI code to the library includes at least one parameter identifying the defined polling time interval, and wherein at least one parameter of the first plurality of parameters of the first call issued from the UI code to the library specifies associated chart metadata for a chart of the plurality of charts of the first dashboard component, wherein the associated chart metadata includes a first chart type identifying a particular chart type for the chart, and wherein the first chart type is one of a predefined set of chart types including a bar chart, a line chart, and a graph.

18. A non-transitory computer readable medium comprising code stored thereon that, when executed, performs a method of rendering a user interface (UI) comprising:

issuing a first call from UI code of a data storage system management application to a library in accordance with an application programming interface (API) to render a first dashboard component of the UI, wherein the first call includes a first plurality of input parameters that specify first metadata for the first dashboard component and that specify first request parameters used to obtain information from a server to populate the first dashboard component with data, wherein the first plurality of input parameters includes a first parameter providing an initial synchronization setting of whether a plurality of charts of the first dashboard component are synchronized or unsynchronized, wherein the initial synchronization setting provides an initial value for a synchronization attribute for the first dashboard component, wherein the synchronization attribute indicates whether the plurality of charts of the first dashboard component are synchronized at a particular point time, wherein the UI includes selectable UI controls to further modify the synchronization attribute between synchronized and unsynchronized at various points in time as desired during execution of the data storage management application, wherein when the synchronization attribute is set to synchronized, an interaction or event in one of the plurality of charts of the first dashboard component is emulated in each other chart of the plurality of charts of the first dashboard component, wherein when the synchronization attribute is set to unsynchronized, an interaction or event in one of the charts of the plurality of charts of the first dashboard component is not emulated in any other chart of the plurality of charts of the first dashboard component, wherein the library includes code that populates and renders UI dashboard components including the first dashboard component, and wherein the UI dashboard components populated and rendered by the library include tables and charts;

responsive to the first call, issuing a first set of one or more requests, from the library to the server in accordance with the first request parameters, to obtain first information used to populate the first dashboard component;

receiving, by the library from the server, the first information;

rendering, by the library, the first component in the UI, wherein said rendering includes populating the first dashboard component with the first information; and performing first processing by code of the library that automatically polls the server periodically at each occurrence of a defined polling time interval to obtain a current version of the first information and accordingly re-renders the first dashboard component of the UI with the current version of the first information, wherein the first plurality of input parameters of the first call issued from the UI code to the library includes at least one parameter identifying the defined polling time interval, and wherein at least one parameter of the first plurality of parameters of the first call issued from the UI code to the library specifies associated chart metadata for a chart of the plurality of charts of the first dashboard component, wherein the associated chart metadata includes a first chart type identifying a particular chart type for the chart, and wherein the first chart type is one of a predefined set of chart types including a bar chart, a line chart, and a graph.

* * * * *